US011490272B2

(12) United States Patent
Mishra et al.

(10) Patent No.: US 11,490,272 B2
(45) Date of Patent: Nov. 1, 2022

(54) RADIO ACCESS NETWORK DYNAMIC FUNCTIONAL SPLITS

(71) Applicant: Parallel Wireless, Inc., Nashua, NH (US)

(72) Inventors: Rajesh Kumar Mishra, Westford, MA (US); Babak Jafarian, Nashua, NH (US); Praneet Chivate, Nashua, NH (US)

(73) Assignee: Parallel Wireless, Inc., Nashua, NH (US)

( * ) Notice: Subject to any disclaimer, the term of this patent is extended or adjusted under 35 U.S.C. 154(b) by 0 days.

(21) Appl. No.: 16/655,225

(22) Filed: Oct. 16, 2019

(65) Prior Publication Data

US 2020/0128414 A1    Apr. 23, 2020

Related U.S. Application Data

(60) Provisional application No. 62/746,546, filed on Oct. 16, 2018.

(51) Int. Cl.
*H04W 24/02* (2009.01)
*H04W 48/08* (2009.01)
*H04W 72/08* (2009.01)
*H04W 84/00* (2009.01)

(52) U.S. Cl.
CPC ........... *H04W 24/02* (2013.01); *H04W 48/08* (2013.01); *H04W 72/085* (2013.01); *H04W 84/005* (2013.01)

(58) Field of Classification Search
CPC ... H04W 24/02; H04W 48/08; H04W 72/085; H04W 84/005
See application file for complete search history.

(56) References Cited

U.S. PATENT DOCUMENTS

| 9,998,310 B2* | 6/2018 | Barbieri | H04L 69/32 |
| 10,237,908 B2* | 3/2019 | Cao | H04W 84/045 |
| 10,367,677 B2 | 7/2019 | Parkvall et al. | |
| 10,608,797 B2* | 3/2020 | Park | H04W 72/046 |
| 10,630,410 B2 | 4/2020 | Parkvall et al. | |
| 10,841,967 B2* | 11/2020 | Teyeb | H04W 76/15 |
| 10,886,976 B2* | 1/2021 | Rajagopal | H04B 7/0848 |

(Continued)

FOREIGN PATENT DOCUMENTS

| WO | 2016145371 A2 | 9/2016 |
| WO | 2018031057 A1 | 2/2018 |

*Primary Examiner* — Chi H Pham
*Assistant Examiner* — Weibin Huang
(74) *Attorney, Agent, or Firm* — Michael Y. Saji; David W. Rouille

(57) ABSTRACT

Systems and methods for Radio Access Network dynamic functional splits are de-scribed. In one embodiment, a method may be disclosed for Radio Access Network dynamic functional splits, comprising: determining, by a user for a RAN, a first split of different functionalities between a central Unit (CU) and a Distributed Unit (DU), the functionalities including a Radio Resource Controller (RRC), a Packet Data Convergence Protocol (PDCP), a Radio Link Control (RLC); a Medium Access control (MAC), a Physical Layer (PHY), and a Radio Frequency Unit (RF); and wherein the system is able to provide different splits of the functionalities based on factors such as user count, fronthaul capacity, fronthaul usage, required baseband processing capacity, and latency.

14 Claims, 33 Drawing Sheets

(56) References Cited

U.S. PATENT DOCUMENTS

| | | |
|---|---|---|
| 11,159,982 B2* | 10/2021 | Rajagopal ............ H04B 7/0456 |
| 2011/0044243 A1 | 2/2011 | Yi et al. |
| 2013/0017852 A1 | 1/2013 | Liu et al. |
| 2016/0233951 A1 | 8/2016 | Tsuji |
| 2016/0234819 A1 | 8/2016 | da Silva et al. |
| 2017/0272330 A1 | 9/2017 | Cao et al. |
| 2018/0160337 A1 | 6/2018 | Gupta et al. |
| 2019/0254047 A1* | 8/2019 | Ahmed ............. H04W 28/0231 |
| 2020/0008125 A1* | 1/2020 | Pennington ........... H04W 40/02 |
| 2020/0068631 A1* | 2/2020 | Wang ................... H04W 76/11 |

\* cited by examiner

RADIO ACCESS NETWORK DYNAMIC FUNCTIONAL SPLITS

CROSS-REFERENCE TO RELATED APPLICATIONS

This application claims priority under 35 U.S.C. § 119(e) to U.S. Provisional Pat. App. No. 62/746,546, filed Oct. 16, 2018, titled "Radio Access Network Dynamic Functional Splits" which is hereby incorporated by reference in its entirety for all purposes. This application hereby incorporates by reference, for all purposes, each of the following publications in their entirety for all purposes: U.S. Pat. App. Pub. Nos. US20140133456A1, US20150094114A1, US20150098385A1, US20150098387A1, US20160044531A1, US20170013513A1, US20170019375A1, US20170026845A1, US20170048710A1, US20170055186A1, US20170064621A1, US20170070436A1, US20170077979A1, US20170111482A1, US20170127409A1, US20170171828A1, US20170181119A1, US20170202006A1, US20170208560A1, US20170238278A1, US20170257133A1, US20170272330A1, US20170273134A1, US20170288813A1, US20170295510A1, US20170303163A1, US20170347307A1, US20180123950A1, and US20180152865A1; and U.S. Pat. Nos. 8,867,418; 8,879,416, 9,107,092, 9,113,352, 9,232,547, and 9,455,959. The documents incorporated above for reference provide detailed information about aspects of an exemplary system for implementing the present invention, namely, the documents describe details of the Parallel Wireless HetNet Gateway (HNG) and Parallel Wireless Converged Wireless System (CWS) described below.

BACKGROUND

Centralized baseband processing was introduced several years ago to ease installation of wireless base stations in large buildings and on campuses. This was enabled by digital radio interfaces and remote radio heads (RRHs) which allowed the connection between RRHs and digital baseband units (BBUs) to be carried over fiber. The concept has subsequently been generalized to span larger areas involving many radio sites and still using a central BBU. In increasing the deployment footprint, fiber and availability of required fronthauls (FHs) became a major problem.

In recent years, 3GPP and other standards bodies started different activities to address this issue. By distributing protocol stacks between different components (different splits), solution providers focus to address the tight requirements for a near perfect FH between RRHs and BBUs. However, the approach of the standards bodies has been to provide multiple potential options, leaving network operators at the mercy of equipment vendors' assessment of their likely fronthaul needs.

SUMMARY

Systems and methods for Radio Access Network dynamic functional splits are described. In one embodiment, a method may be disclosed for Radio Access Network dynamic functional splits, comprising: determining, by a user for a RAN, a first split of different functionalities between a central Unit (CU) and a Distributed Unit (DU), the functionalities including a Radio Resource Controller (RRC), a Packet Data Convergence Protocol (PDCP), a Radio Link Control (RLC); a Medium Access control (MAC), a Physical Layer (PHY), and a Radio Frequency Unit (RF); and wherein the system is able to provide different splits of the functionalities based on factors such as user count, fronthaul capacity, fronthaul usage, required baseband processing capacity, and latency.

In another example embodiment, a non-transitory computer-readable medium containing instructions for providing Radio Access Network (RAN) dynamic functional splits is de-scribed which, when executed, cause the system to perform steps comprising: determining, by a user for a RAN, a first split of different functionalities between a central Unit (CU) and a Distributed Unit (DU), the functionalities including a Radio Resource Controller (RRC), a Packet Data Convergence Protocol (PDCP), a Radio Link Control (RLC); a Medium Access control (MAC), a Physical Layer (PHY), and a Radio Frequency Unit (RF); and wherein the system is able to provide different splits of the functionalities.

In another example embodiment, a system for providing Radio Access Network (RAN) dynamic functional splits is described. The system includes a converged wireless system (CWS); a HetNet Gateway (HNG) in communication with the CWS; wherein a user is enabled to determine a first split of different functionalities between a central Unit (CU) and a Distributed Unit (DU), the functionalities including a Radio Resource Controller (RRC), a Packet Data Convergence Protocol (PDCP), a Radio Link Control (RLC); a Medium Access control (MAC), a Physical Layer (PHY), and a Radio Frequency Unit (RF); and wherein the system is able to provide different splits of the functionalities.

DETAILED DESCRIPTION

Figure 1:
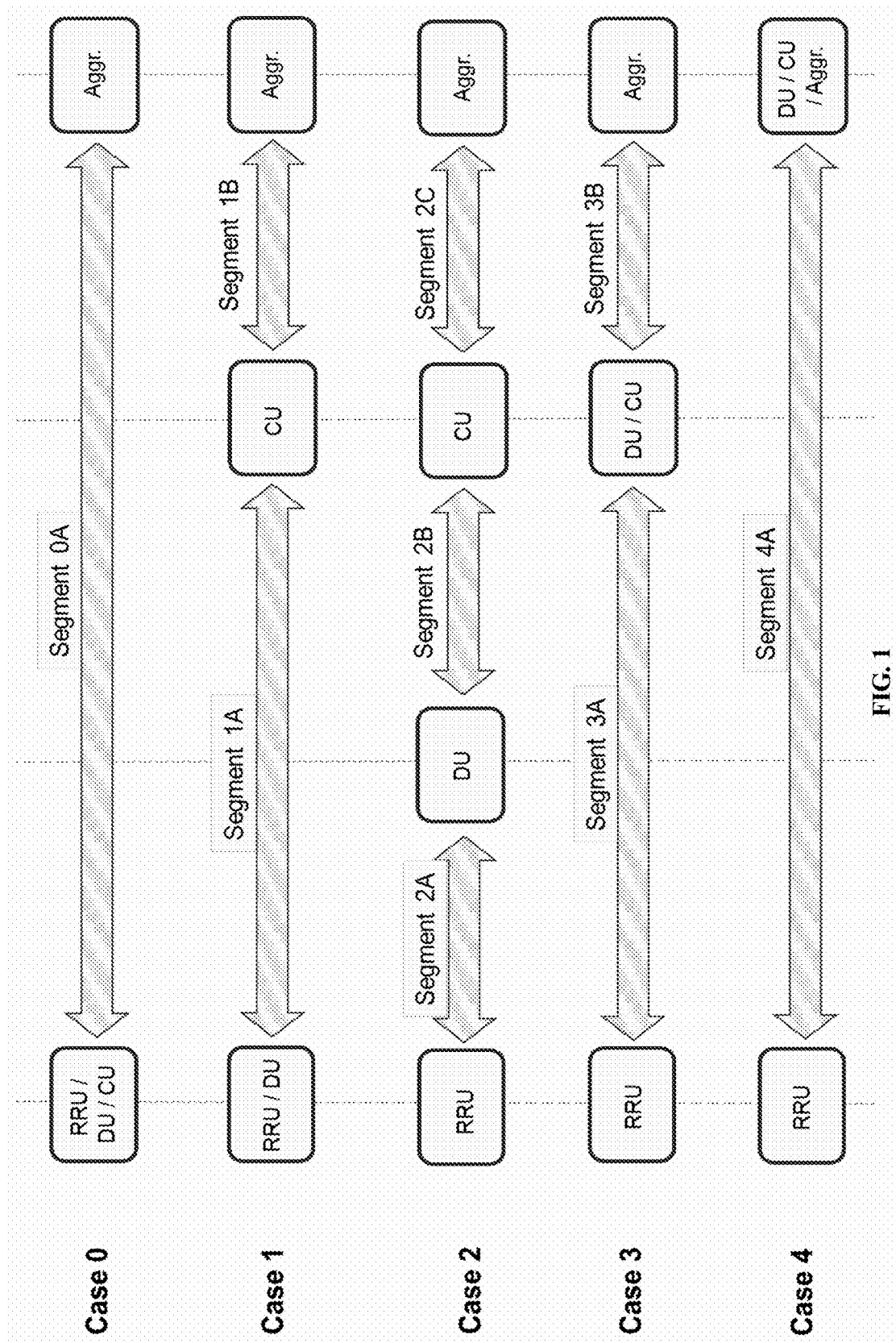
FIG. 1 is a diagram showing example deployment cases, in accordance with some embodiments.

Parallel Wireless's dynamic architecture is the only available solution for mobile operators to utilize different splits based on morphology and infrastructure availability. While for rural deployment higher splits are more desirable, for dense urban areas lower splits will be the optimum solution. Parallel Wireless's dynamic solution will enable mobile operators to pick and choose different splits based on the same hardware and network components by using different software implementations. Different protocol layers will reside in different components based on FH availability and morphology. This approach will dramatically reduce the cost of operations and ownership for mobile operators.

The logical topology of FH will be diversified in the future 5G networks. As mentioned previously, centralized cooperative processing requires an FH network to aggregate (distribute) information from (to) multiple RRHs to a BBU or transport information between BBUs. This will not be an optimal solution to be applied for different deployment scenarios based on different morphologies. Therefore, as a part of 3GPP framework, multiple functional splitting has been proposed to meet these diverse requirements. It is clear that the existing C-RAN concept (split 8) is an optimal solution for future systems. We believe a dynamic functional split between a central unit (CU) and distributed unit (DU) will be the approach for 5G systems and beyond. While CUs will maintain BBU-like functionalities, DUs will be more than RRH in terms of processing capacities. In case of requirements for more delay-sensitive service in 5G (including but not limited to beamforming and configuration), based on appropriate FH availability, the MAC-PHY split will be the preferred solution. Parallel Wireless believes the future 5G is not about specific split but more about flexibility and the ability to create different splits based on different morphologies and deployment scenarios. Parallel Wireless 5G RAN visualization will address all these requirements through its HetNet Gateway (HNG) as an anchoring point and aggregator.

For migration to 5G there may also be the need to transport information among DUs when cooperative processing functions are placed at DUs. Moreover, when the function splitting scheme is dynamically changed, the FH networking topology needs to be adapted accordingly. At Parallel Wireless we have already utilized dynamic functional splitting by utilizing our HNG and Converged Wireless Systems (CWS) for 3G and 4G deployments.

RAN virtualization brings the flexibility to decouple the radio and RF from the base band processing and allocate resources, when and where needed, in the most optimized manner. The Parallel Wireless solution provides all necessary functionality to address this requirement based on its HNG by providing abstraction, core network isolation and resource utilization. This is optimal for rural and remote areas with lower numbers of users, lower traffic and less than perfect FH. The Parallel Wireless 3G/4G solution is deployed across the world with HNG as the aggregator located remotely in operators' colocation facilities and CWSs act as a compact RRH/BBU single unit with different FHs including commercial LTE services and DSLs.

In super dense areas; e.g. stadium, shopping malls, the general tendency is moving toward legacy split 8. While BBUs are going to be located in the vicinity, a low latency and reliable FH (CPRI type of connection) can connect all RRUs to the central local location. While Parallel Wireless can support such a scenario, HNG capabilities can eliminate the need of super low latency and reliable FH links to a more available and cheaper solution like standard cat5/6 connections and reduce the cost of implementation dramatically. The present document intends to approach the evolution of RAN towards virtualization together with the impacts on the underlying transport network, in segments like fronthaul, midhaul or backhaul, depending on the functional split considered on the radio part. The potential deployment cases into consideration are reflected in FIG. 1.

Figure 2:
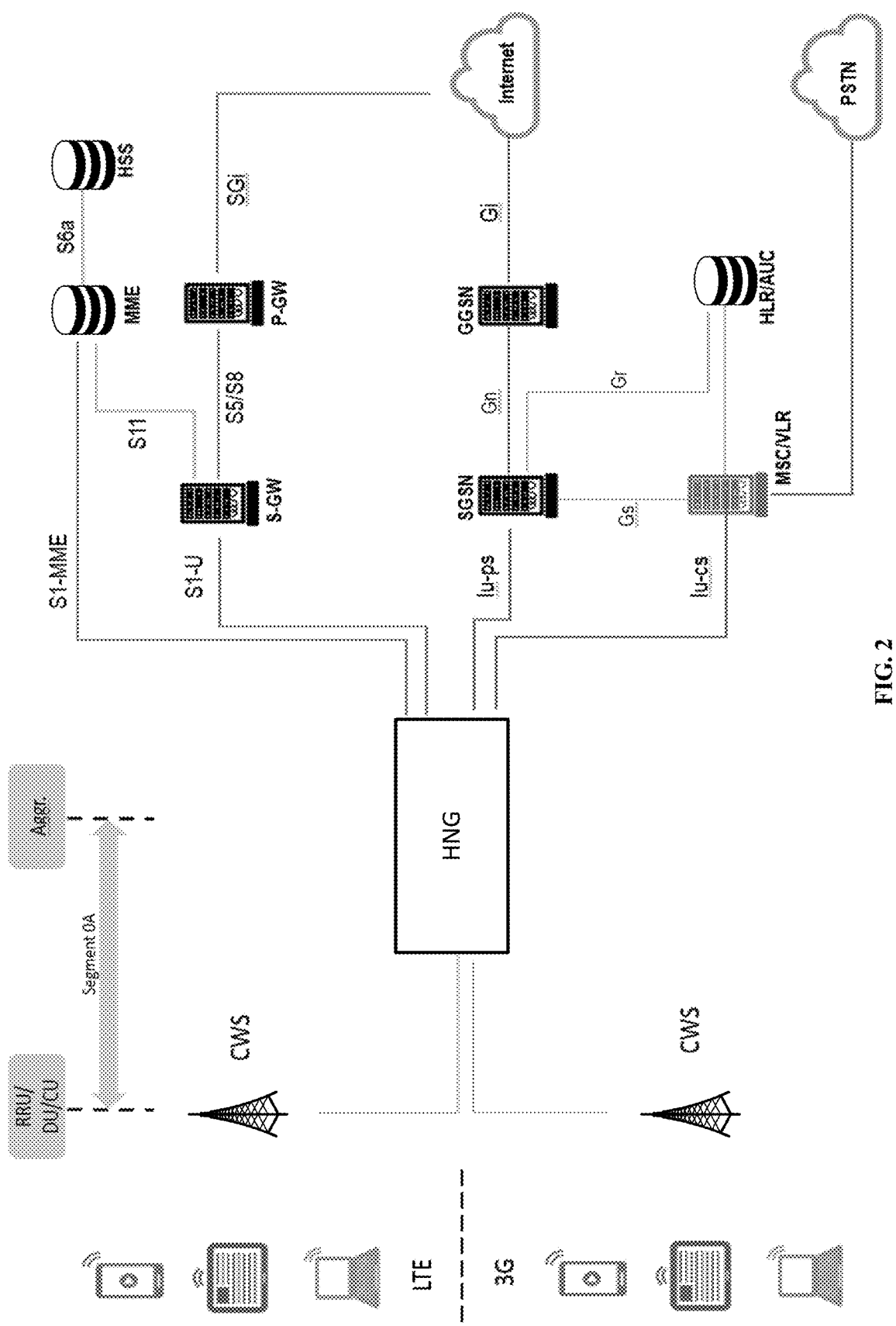
FIG. 2 is a diagram showing a system having an HNG and multiple CWSs, in accordance with some embodiments.

Parallel Wireless 3G/4G solution is based on HetNet Gateway (HNG) as the gateway between operator's core networks (Aggregator) and Converged Wireless System (CWS)s. Parallel Wireless's innovative solution already developed based on Split 0 general access schema in mind to provide an easy migration path toward 5G while reducing the impact of less than perfect fronthaul in system performance. From core network perspective HNG will act as a single (e)NodeB (E)UTRAN and act as the aggregator. CWSs are compact (e)NodeBs including RRU/DU/CU. In all deployed scenarios, a less than perfect fronthaul between HNG and CWS provides connectivity while maintaining required QoS. This is shown in FIG. 2.

HNG

Parallel Wireless HetNet Gateway (HNG) logically sits between Radio Access Network (RAN) and core network, and abstracts RAN on any COTS hardware for core network. At the same time, making RAN self-configuring, self-optimizing, and self-healing through its Self-Organizing Network (SON). The Parallel Wireless solution utilizes standard backhaul and provides more robustness by its split functionality. By virtue of having detailed information about all the base stations on the network, as well as all the UEs on the network, the HNG is positioned to determine, based on a large number of potential factors, what the appropriate functional split is for a given network context, and can control the CWS (base station) to utilize the appropriate split.

CWS

Parallel Wireless Converged Wireless System (CWS) is a cost-effective and compact eNB. They are software-defined multi-mode multi-carrier base stations coming in different transmit powers. They can utilize any type of preferred external antenna via a 4.3-10 low PIM connector. The compact all-in-one design approach helps to achieve the right level of system capabilities and attractive economics for fixed wireless service providers to deliver a wide-variety of deployments with the extremely low cost per unit coverage ratio. The CWS operates in conjunction with the HNG (for management) and with the VRU (for baseband processing).

VRU

Based on any COTS hardware, this component provides MAC, RLC and PDCP functionality to one or more CWSes, e.g., in a centralized fashion. It communicates to a cluster of CWSs (RRH/DU) and supports multiple carriers based on the CWSs' load. The interface between VRU and CWSs can be based on Ethernet based eCPRI, in some embodiments.

Parallel Wireless has already developed its innovative 3G/4G solution based on Split 0 access schema, and its solution is open for any other access schema and split modification based on specific requirements. For example, in case of requirements for more delay sensitive service in 5G (including but not limited to beamforming and configuration), Parallel Wireless virtual radio unit (VRU) can still act as the aggregator and splits 1, 2 or 3 utilize based on appropriate fronthaul availability and preferred split option (in this specific case, MAC-PHY split). Parallel Wireless believe the future 5G is not about specific split but more about flexibility and ability to create different splits based on different morphologies and deployment scenarios. Parallel Wireless 5G RAN visualization will address all these requirements through the combination of its HNG and VRU as anchoring point and aggregator.

RAN virtualization brings the flexibility to decouple the radio and RF from the base band processing and allocate resources; when and where needed, through the most optimized manner. Parallel Wireless solution provides all necessary requirements to address this requirement based on its HNG and VRU by providing abstraction, core network isolation and resource utilization.

Specific functional splits are described hereinbelow.

Split 0

For 3G deployments, HNG concentrates all NodeBs and provide single connectivity to Packet Switched (PS) and Circuit Switched (CS) core networks through standard Iu-cs and Iu-ps. As it mentioned before, from core networks perspective, there is one NodeB deployed in the network. Also, HNG will act as a Virtual RNC (vRNC) and aggregates all CWSs as a single NodeB. Using HNG as an aggregation point toward core network, will reduce network related delays for services like Circuit Switched Fall Back (CSFB) while users are connected to LTE network and needs to go back to 3G or 2G network for voice (circuit switched) services.

For LTE deployments, HNG concentrates all eNodeBs and provide a single S1-U connection to S-GW for data traffic and a single S1-MME connection to MME for all signaling and control related traffic. In this case, HNG will act as an aggregator of S1 signaling toward S-GW and MME. This will reduce all handover and paging related signaling and control messages toward core network (EPC).

This option would be an ideal solution for deployments with low throughput and high latency (e.g., satellite). While HNG acts only as aggregator and anchoring point toward the core for reducing signaling and all SON functionalities, all other functionalities are embedded in the CWS. These include RF, PHY, MAC, PDCP and RRC. This architecture works with low throughput and very high latency backhauls and could be the best solution for remote rural deployment without sufficient infrastructure. In case of high traffic load, there may be need for adding VRU.

In general, for rural and remote areas with lower number of users, lower traffic and less than perfect fronthauls, access schema split 0 is the preferred one. At the moment, Parallel Wireless 3G/4G solution deployed across the world with VRU as the aggregator located remotely in operator's colocation facilities and CWSs act as a compact RRU/DU/CU single unit with different fronthauls including commercial LTE services and DSLs.

On the other extreme in super dense areas; e.g. stadium, shopping malls, the general tendency is moving toward access schema split 4. While DU/CU/Aggregator are going to located in the vicinity, a low latency and reliable fronthaul (CPRI type of connections) can connect all RRUs to the central local location through segment 4A. VRU capabilities can eliminate the need of super low latency and reliable fronthaul links to more available and cheaper solution like standard cat5/6 connections and reduce the cost of implementation dramatically.

Figure 3A:
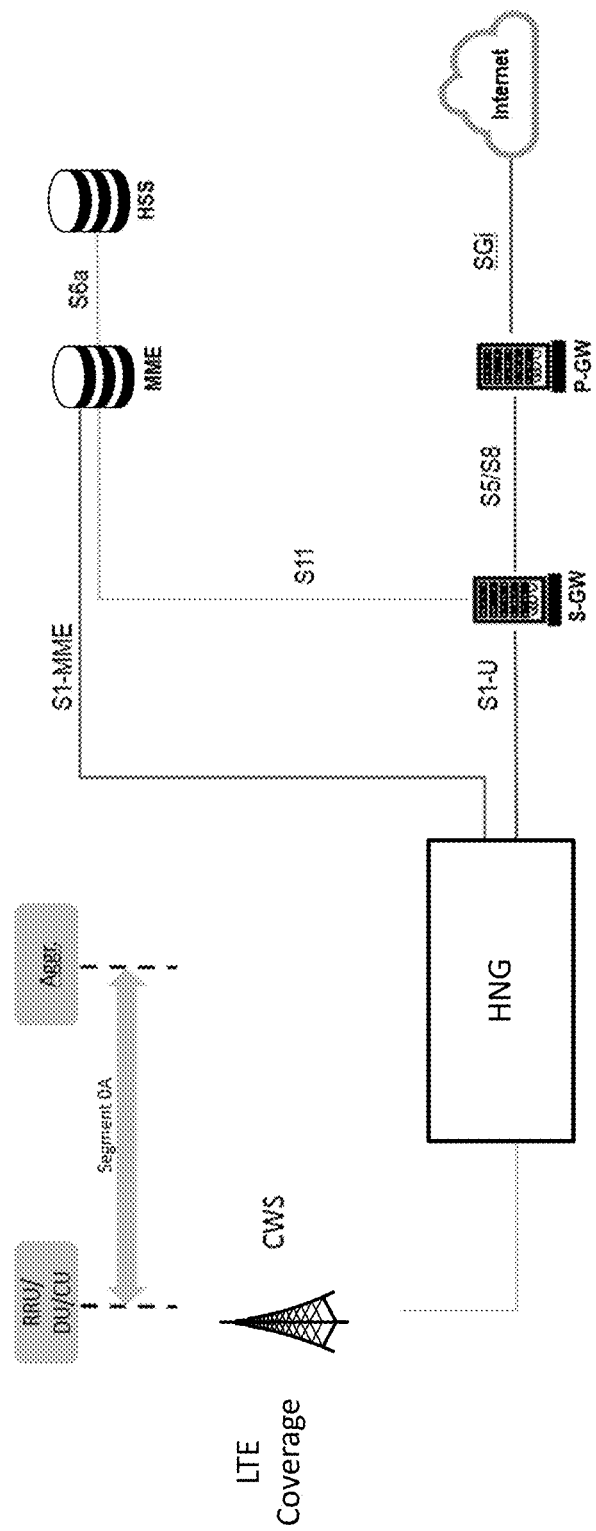
FIGS. 3A and 3B are a diagram showing a 4G solution based on split 1, in accordance with some embodiments.
Figure 3B:
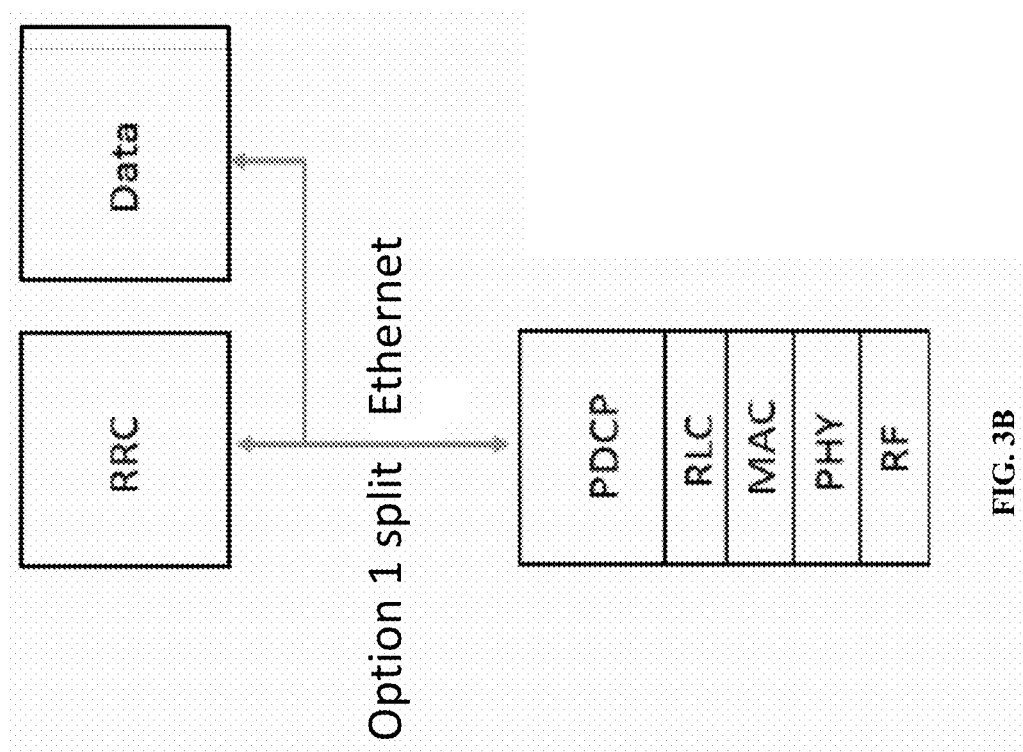
Figure 4A:
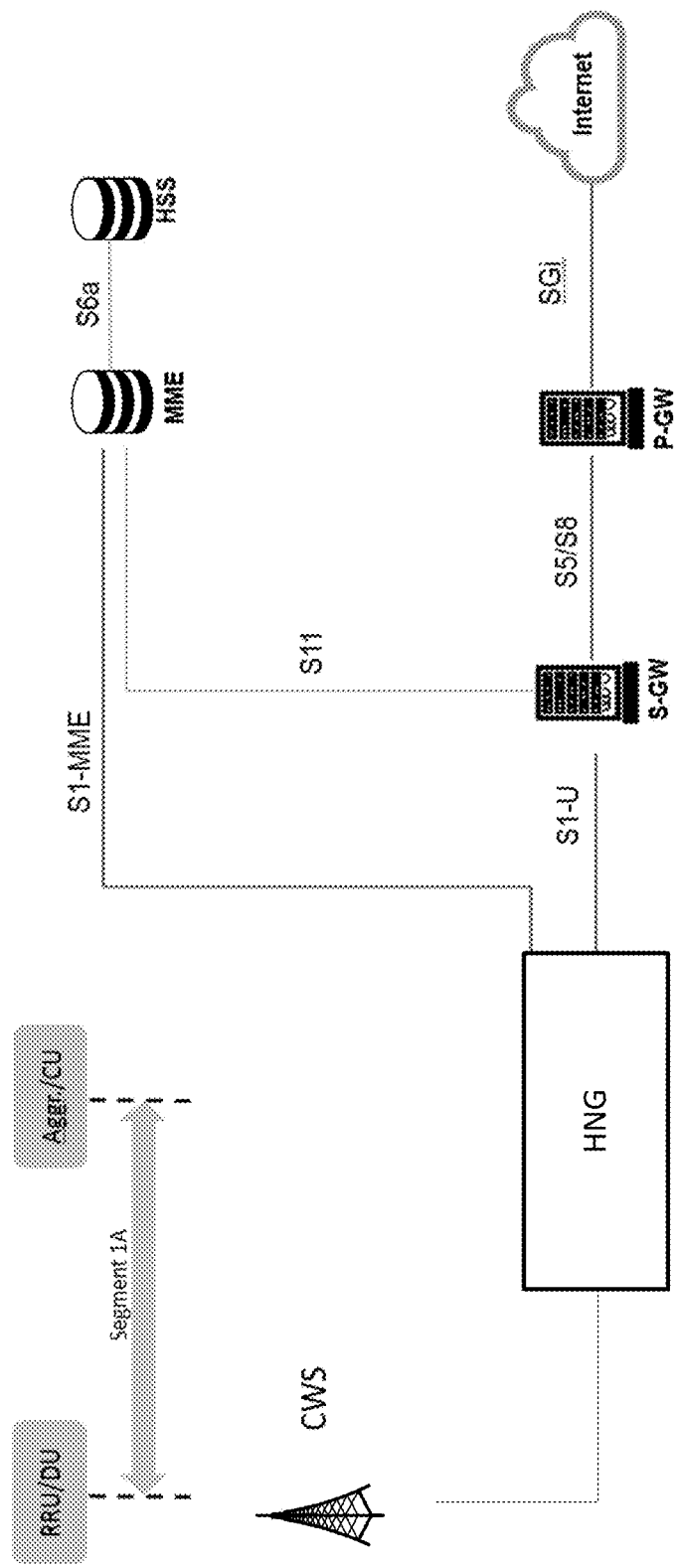
FIGS. 4A and 4B are a diagram showing a 4G solution based on split 6, in accordance with some embodiments.
Figure 4B:
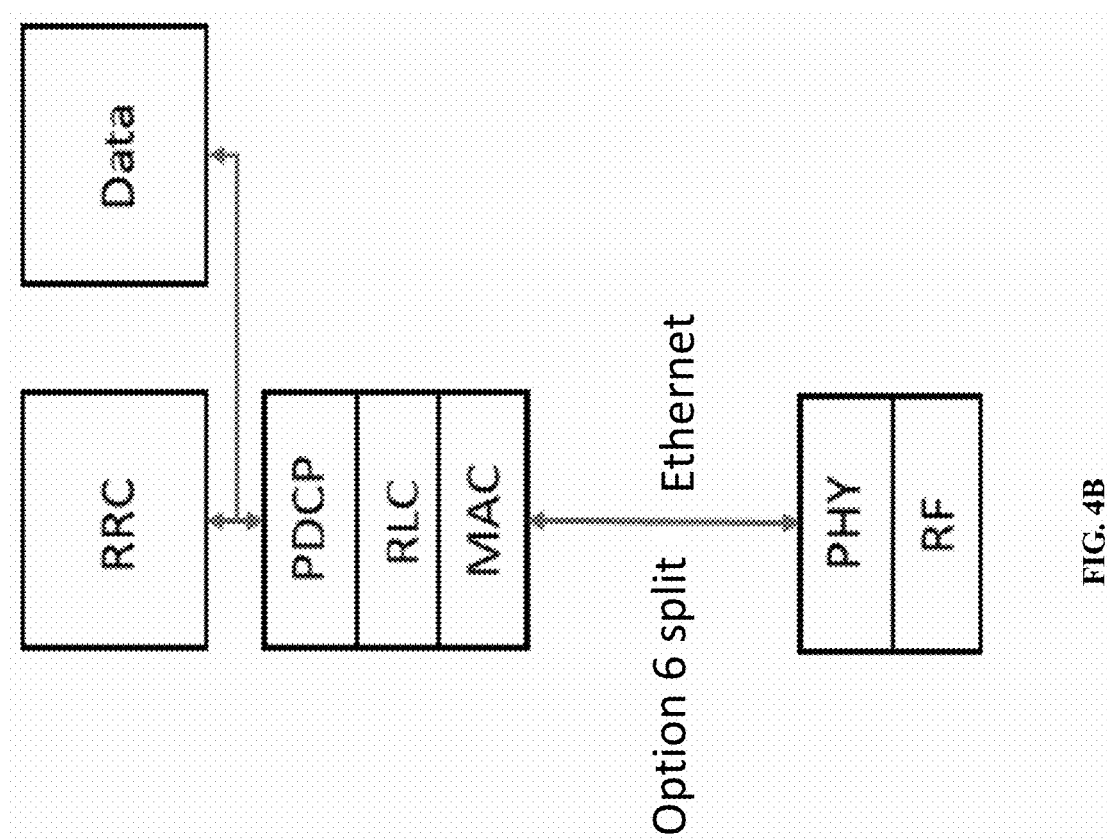

Parallel Wireless has successfully deployed its 4G solution based on split 1 and utilizing access schema split 0 across the world as it is shown in the following figure. HNG acts as an aggregator and includes SON functionalities. The fronthaul can be standard commercial LTE network (through the Internet) or other legacy WANs. This approach dramatically reduces the cost of deployment and OPEX by utilizing commercially available access networks as its fronthaul for many rural and semi urban morphologies. This is shown in FIGS. 3A and 3B, and also in FIGS. 4A and 4B.

For deployment in dense urban areas, Parallel Wireless has successfully utilized split 7, in order to keep RF and PHY at CWSs and using less than perfect fronthauls to connect them to HNG which hosts PDCP, RLC, and MAC as the centralized unit. Parallel Wireless's flexible architecture makes deployment of 4G solution easy and seamless since base on morphology and availability of fronthaul its technology can adapt to available resources.

Split 2

Figure 5A:
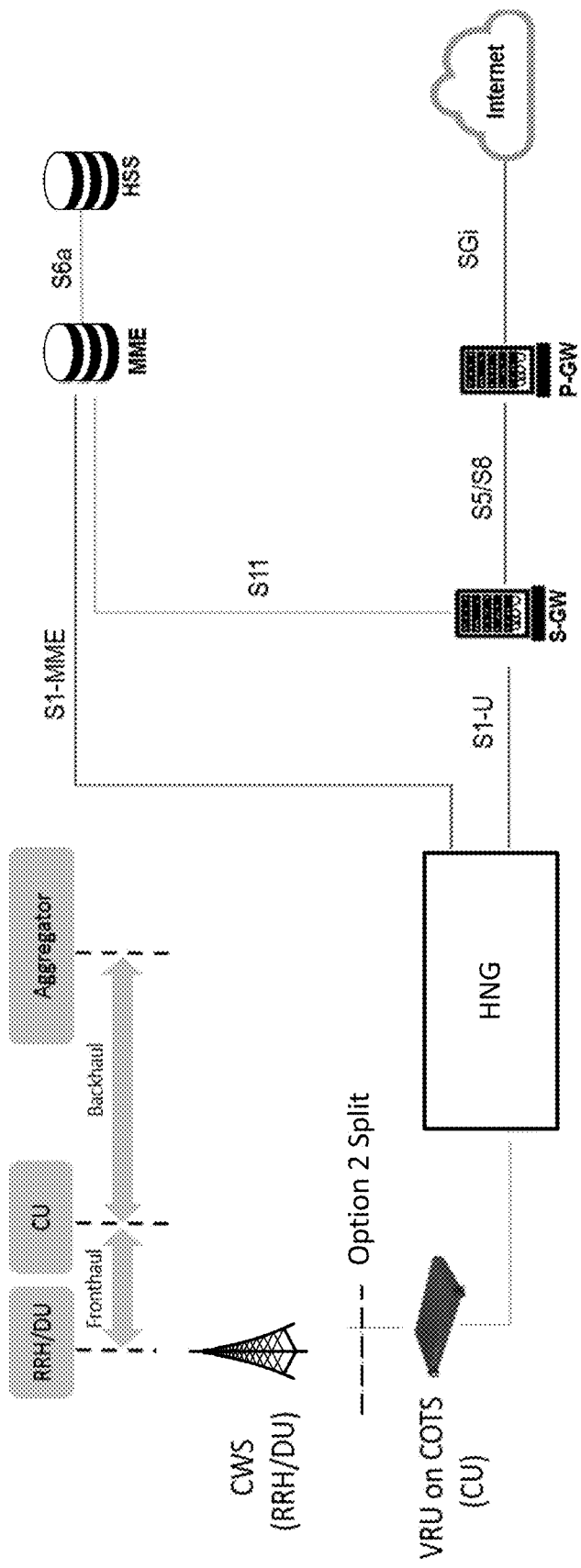
FIGS. 5A and 5B are a diagram showing a 4G solution based on split 2, in accordance with some embodiments.
Figure 5B:
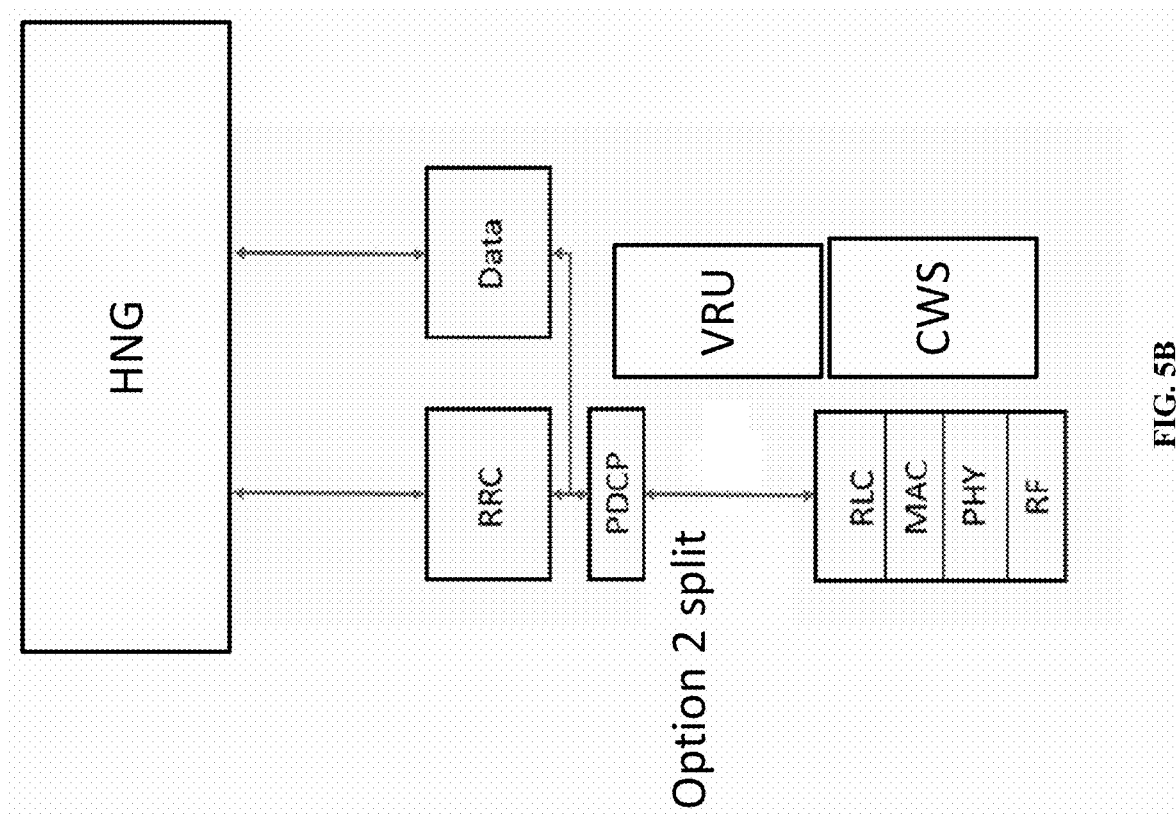

Split 2 is recommended for deployment in rural and semi-urban areas with non-ideal backhaul. In the Parallel Wireless Solution split 2 could be realized with RRC, S1-U (data) and PDCP functions to be hosted in VRU in close proximity to the CWS and the Lower layers RLC, MAC and PHY on the CWS. This option allows some part of the stack to be virtualized at the VRU and connected to the aggregator (HNG) through a less than perfect backhaul. The PDCP RLC split is already standardized in the LTE dual connectivity. This is shown in FIGS. 5A and 5B This option would be ideal in case the FH options are not able to ensure the latency/jitter requirements of some of the lower split options and in implementation would mean a very straight and clean split. The overhead of traffic is also minimal and is comparative to non-split FH requirements. Option 2 split enables virtualization of some part of the stack function and also provides the option to reduce processing overheads on the RRH or DU. Another advantage of this split option, especially with the Parallel Wireless solution, is the Dual Connectivity will be very efficiently implemented and back routing of data packets over the X2 interface is avoided. Since the VRU is close to the CWSs and can support many of them in a close proximity, there is significant overhead reduction in packet routing when the Option 2 split is implemented.

Based on 3GPP TS 36.213 for DL, 8 layers, 256QAM, the TB bits are 391656 (per TTI), therefore the maximum downlink throughput will be 391 Mbps. For uplink, assuming category 17/19 (supporting 256QAM) the UL TB bits are 211936 (per TTI) therefore the maximum UL through put will be 212 Mbps.

Considering the 5% overhead, the maximum bi-directional link capacity for split 2 will be:

$$(391+212)*1.05=637 \text{ Mbps}$$

Also, latency up to 25 msec will be tolerable for this split.

Split 2 can be a great candidate for rural and deployments with less than perfect transport availability. For remote locations with satellite, DSL or commercial LTE as the only option for FH this split will be the perfect solution. However, because the DU needs to host PHY/MAC/RLC close to RRH, the remote units are more complex and expensive.

Split 6

Figure 6A:
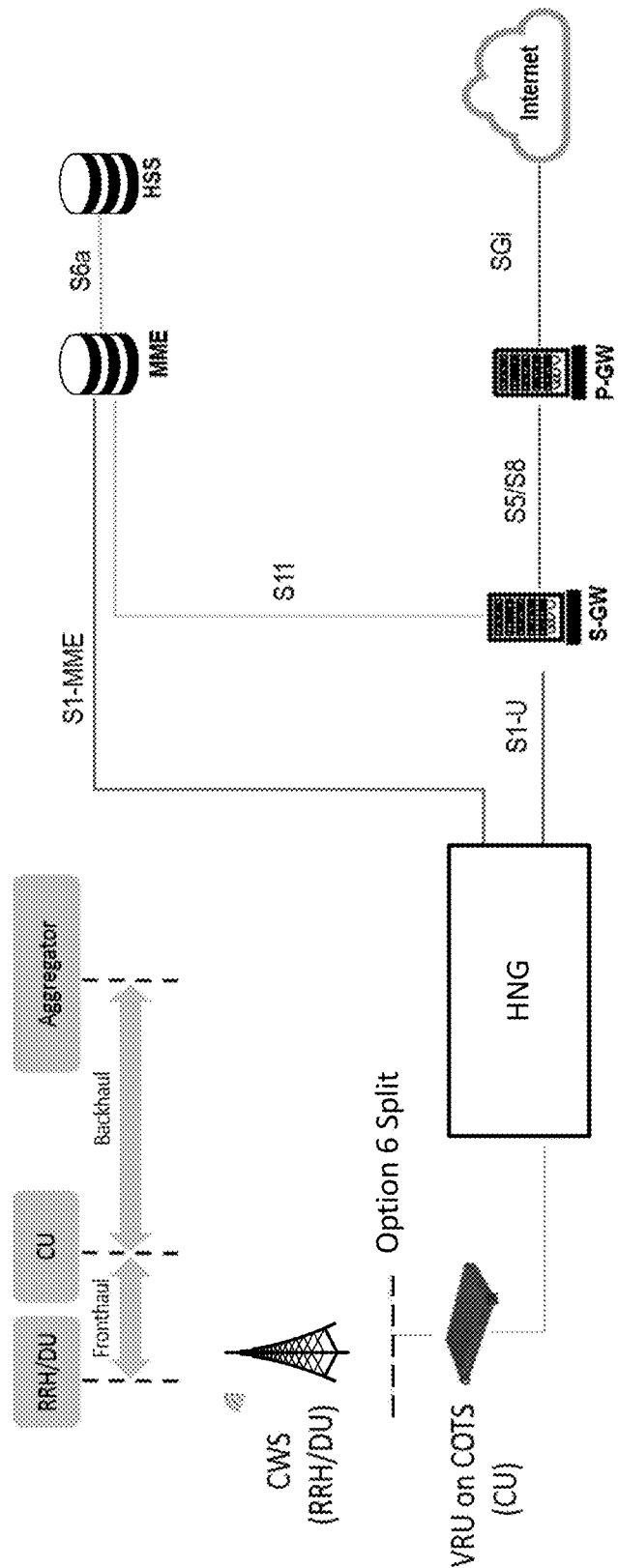
FIGS. 6A and 6B are is a diagram showing a 4G solution based on split 6, in accordance with some embodiments.
Figure 6B:
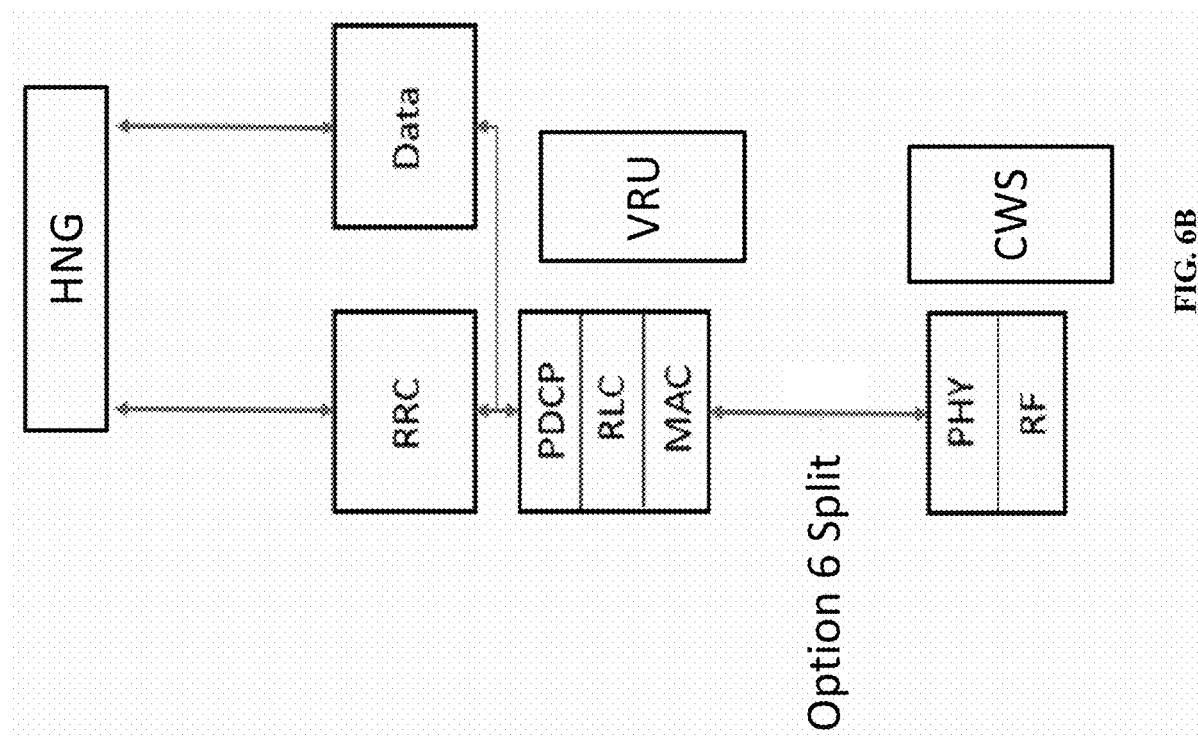

For deployment in dense urban areas, Parallel Wireless has successfully utilized split 6. In this architecture, the CWS contains RRH and the DU includes RF and PHY. VRU will be in close proximity to CWS and host PDCP, RLC, and MAC as the CU. In this architecture a CU can support multiple CWSs collocated on the same tower or rooftop. While the FH can be a 1G/10G type of connection, the backhaul to HNG can be a less than perfect connection. Parallel Wireless's flexible architecture makes deployment of the 4G solution easy and seamless since base on morphology and availability of backhaul, its technology can adapt to necessary resources. This is shown in FIGS. 6A and 6B.

Legacy centralized baseband (split 8) in most cases promises load balancing between sites, taking advantage of the fact that peak loads do not occur uniformly. However this must be balanced against any increase in the cost required to achieve the load balancing, e.g., for switching radio traffic between different processors. Field studies have found that a relatively small number of base stations still provide good heterogeneity, and that most of the potential for load balancing gains can be leveraged with about 20 sites. In addition, certain "computationally expensive" processing tasks such as fast Fourier transform/inverse fast Fourier transform (FFT/IFFT) are not load dependent and exhibit no sharing gains. Also, considering HARQ management at the MAC level is one of the most traffic related processes it will be beneficiary to utilize split 6 for scenarios where there are sites with different demographics (e.g., business and residential) and less than perfect backhauls in terms of latency (around 8 msec RTT).

Transport Requirements

Based on 3GPP TS 36.213 for DL, 8 layers, 256QAM, the TB bits are 391656 (per TTI) therefore the maximum DL throughput will be 391 Mbp. For uplink, assuming category 17/19 (supporting 256QAM) the UL TB bits are 211936 (per TTI) therefore the maximum UL throughput will be 212 Mbps.

Considering the 30% overhead, the maximum bi-directional link capacity for split 6 will be:

(391+212)*1.3=784 Mbps

Considering the 8 msec RTT requirements (discussed in AR33), standard 1G WAN connections would be sufficient for split 6 FH.

For calculating the required RTT for this split, we must look into HARQ timing for PRACH and regular data transmission. For the PRACH, eNB is required to answer to the UE within a configurable random-access response window. This window starts three subframes after the last subframe with the respective preamble transmission and has a configurable length between two to ten subframes. Considering the shortest duration for two subframes (2 msec), the UE must receive its response before 4 msec. Considering maximum ranges for LTE (100 Km) and its related timing advance (0.67 msec) and about 1.5 msec for processing time at the CU, it left us with 2 msec RTT for latency between MAC and PHY. Therefore, a maximum one-way latency of 1 msec is required for this split. The standard synchronous transmission and ACK messages which have 8 msec (8 subframe after the initial one) delay budget will not be a dominant factor for this requirement.

Split 6 is well-balanced for urban and dense urban deployments. While the CU can accommodate lots of computationally expensive and load related functionalities of MAC/RLC/PDCP, RU just host the complete PHY stack. The FH requirements are also reasonable and not as tight as splits 7 and 8. However, there is still a need for limited processing power as part of DU close to RRH.

Split 7.1

Figure 7A:
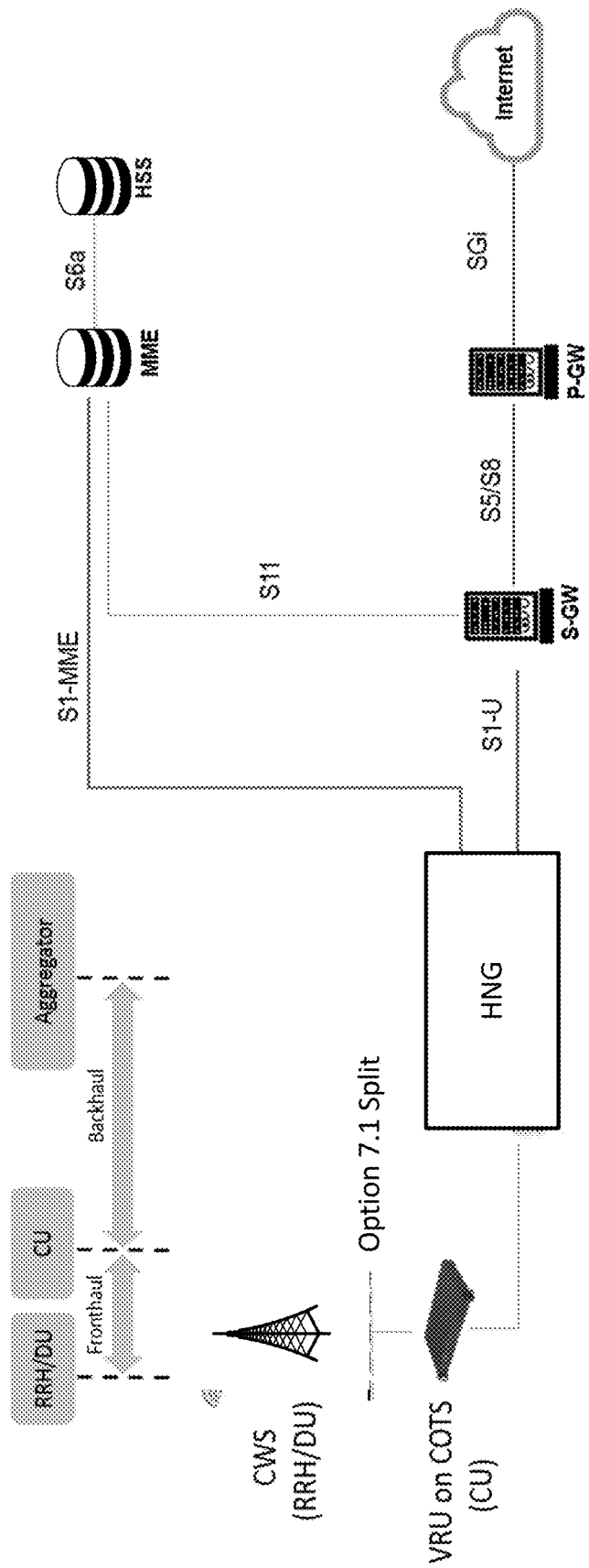
FIGS. 7A and 7B are a diagram showing a solution based on split 7.1 in accordance with some embodiments.
Figure 7B:
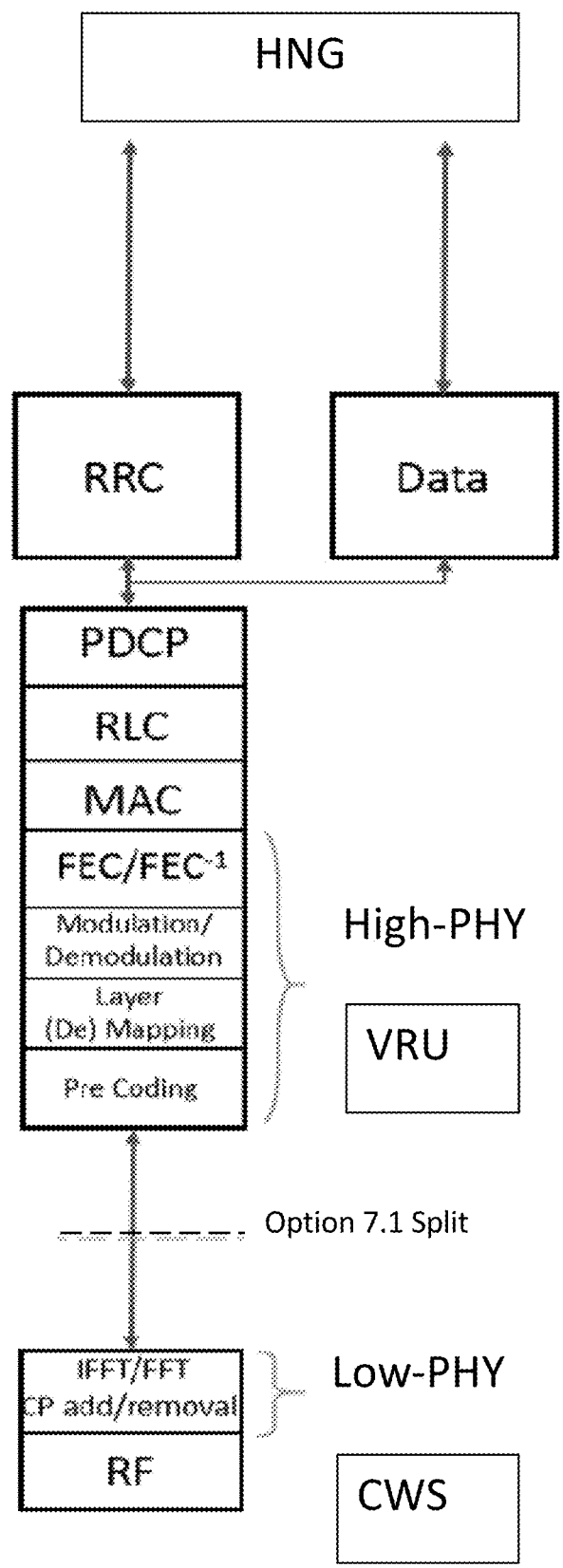

Parallel Wireless recommends option 7.1 split of 3GPP for the case when high throughput and low latency FH is available between VRU and the CWS. This is a very efficient and practical PHY split, considering IFFT/FFT are not load dependent and add no sharing gain by accommodating it in the CU. All other PHY functionalities including coding, modulation, layer mapping and precoding will be located at the CU while IFFT/FFT and CP addition/removal and Radio will be collocated at the DU. Our CWS, VRU and HNG products are naturally equipped to support Split 7.1 as discussed before. Our CWS is composed of an integrated radio front end that serves as a DU which is responsible for antenna to baseband down-conversion (and baseband to antenna up-conversion) and IFFT/FFT and CP addition/removal. VRU will host all other parts of the stack as the CU, while HNG acts as the aggregator. This is shown in FIGS. 7A and 7B.

Considering IFFT/FFT and CP addition/removal, the only parts of overall protocol stack which are not load dependent and they are in DU for split 7.1, this split can be utilized for extreme load balancing scenarios. For morphologies and geographical areas with very non-uniform peak loads, this split can exhibit maximum sharing gain.

Transport Requirements

The requirements for FH capacity can be calculated as the following:

DL

For a 20 MHz channel, 256QAM and 8 layers the required bitrate is:

100 (PRB)×12 (no of subcarriers per PRB)×14 (symbols)×8 (bits per symbol)×8 (layers)×2 (I/Q)/1×10−3 (one subframe)=2.15 Gbps

UL

For a 20 MHz channel, 64QAM and 8 layers the required bitrate is:

100 (PRB)×12 (no of subcarriers per PRB)×14 (symbols)×6 (bits per symbol)×8 (layers)×2 (I/Q)/1×10−3 (one subframe)=1.61 Gbps For split 7.1 the FH needs to support 3.76 Gbps bidirectional The one-way latency of 250 microseconds is expected for split 7.1 option.

Split 7.1 is a good solution for dense urban areas. Considering colocation of lower PHY with RRH, IFFT/FFT functionalities that are not load related will be handled remotely. However, close to perfect FH with latencies below 250 microseconds is required.

Split 8 (C-RAN)

Since RAN deployment and operations takes approximately up to 80% of CAPEX and 60% of OPEX, it has been identified as the main candidate for cost saving in the future deployments. The cloud-based radio access network (C-RAN) was the first attempt in this direction. It evolved from the traditional base stations (BSs) where processing units and radios (RFs) were integrated. The processing capacity of these BSs are used for providing services to mobile users (UEs) attached to them and could not share in a large geographical area. The main drawback for legacy BSs was underutilization of available processing power in each BS. While BSs in business areas are overloaded during the day, the ones in residential areas are almost idle. Due to the increase in in data traffic demands in the recent years, the differences in peak usage in different morphologies causes a huge amount of idle processing powers for certain BSs during the day.

Figure 8B:
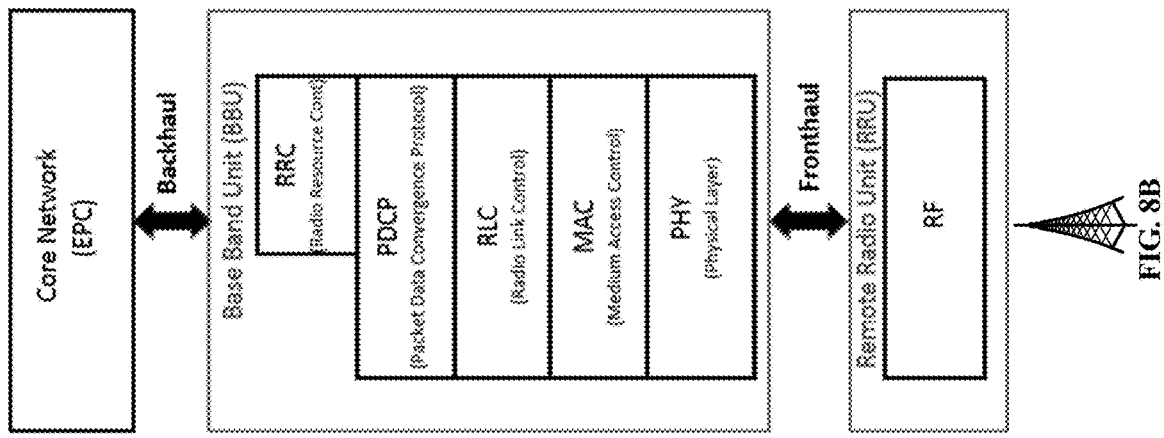
FIGS. 8A and 8B are a diagrams showing a solution based on split 8 in accordance with some embodiments.
Figure 8A:
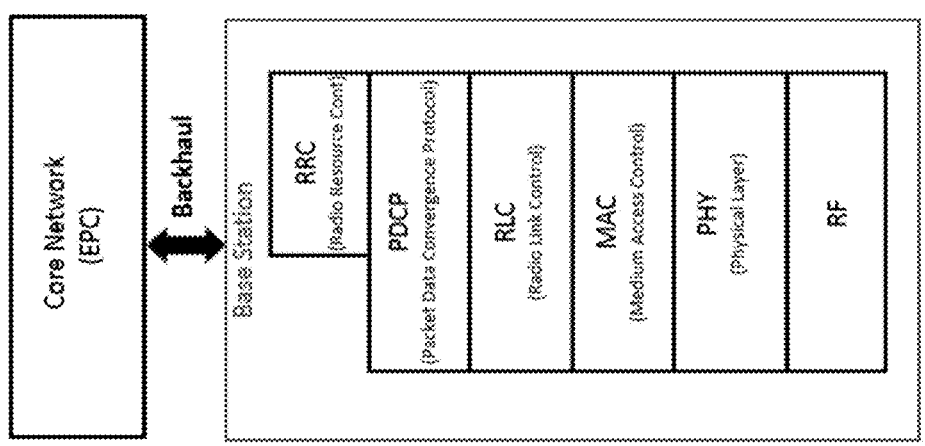

To overcome this challenge, the C-RAN concept was introduced and deployed in recent years. C-RAN is based on centralized processing to combine all BSs' computation and processing resources into a central pool called baseband unit (BBU). The BBUs are a set of physical servers in a data center which enables communications among BSs with low latencies. The BBUs are connected to remote radio heads (RRHs); which transmit and receive signals, through fronthauls (FHs). All protocol stacks are located at BBU and only RF functionality remains at RRU. Since all protocol stacks including physical (PHY) layer are located at BBU, the FHs need to have low latency and high throughputs compared to legacy backhauls to BSs. Also, they need to provide tight synchronization and allow point to point logical topology. Common public radio interface (CPRI) based fiber connections are the standard solution for FHs. This can be seen in FIGS. 8A and 8B.

Figure 9A:
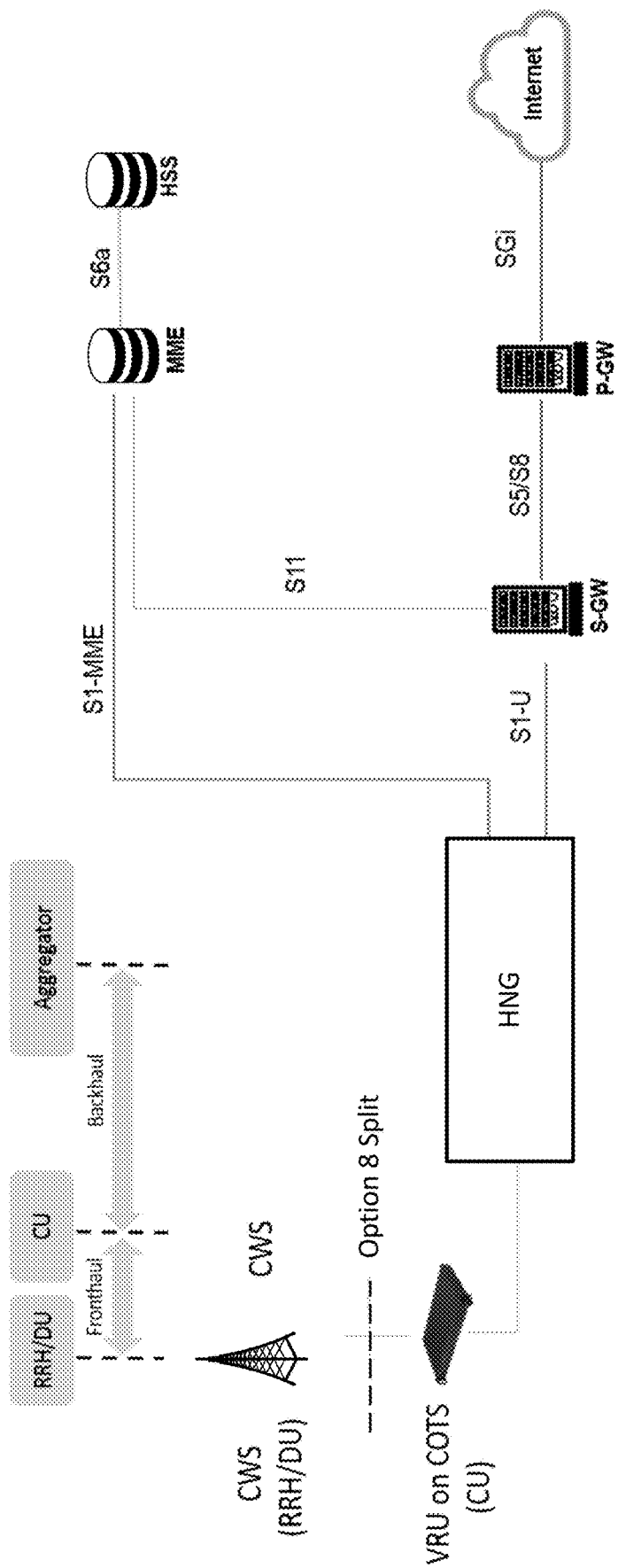
FIGS. 9A and 9B are is a diagram showing a 4G solution based on split 8 in accordance with some embodiments.
Figure 9B:
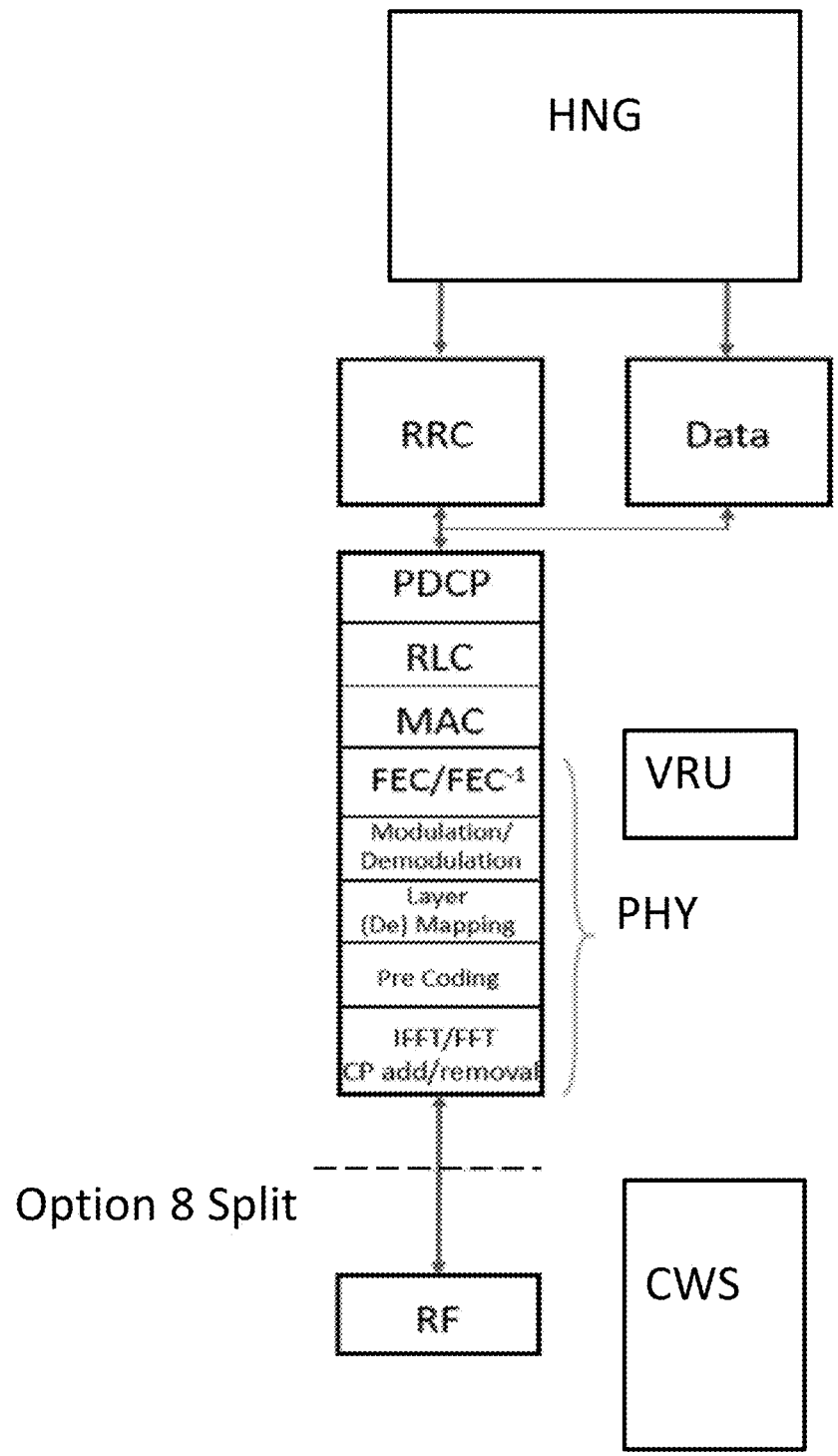

Parallel Wireless recommends option 8 split of 3GPP for the case where perfect FH is available between VRU and the CWS. Since all DU and CU functionalities are located at VRU, CWS will act as an RF transmitted receiver and all base band processing will be conducted at VRU. Since the FH needs to carry all IQ data, it must be a CPRI based interface to meet the requirements. This is shown in FIGS. 9A and 9B.

Transport Requirements

Based on 3GPP R3-162102, considering a 20 MHz channel size, with IQ bandwidth of 2*16 bits and 32 antenna digital ports for both uplink and downlink the required FH through put is:

30.72*32*32 Mbps=31.4 Gbps

With a latency of less than 250 micro second.

Advantages and Disadvantages

Pros: More energy efficient and simplifies the inter-BS coordination, they have their own limitations.

Cons: Although this split minimizes the functionality at RRH, requirements for CPRI FH make it necessary to accommodate DU in the close proximity to RRH, thereby limiting deployment options. Also, some of the computationally intense processing tasks such as fast Fourier transform/inverse fast Fourier transform (FFT/IFFT) are not load dependent and exhibit no sharing gains, therefore there is no gain to centralize lower PHY.

Other major issues include:

Massive FH bandwidth requirements: The bandwidth requirements of a classical FH link are proportional to the product of radio bandwidth, number of antennas, and quantization resolution. To put this into perspective, a typical 20 MHz 4G LTE eNodeB with 8 antennas requires around 10 Gb/s FH bandwidth on uplink (UL) or downlink (DL). Since the area density of antennas and the communications bandwidth are both expected to be even higher in 5G networks, the demand for FH bandwidth will become even more significant. The most straightforward option for physical transport is dark fiber, in which one fiber core can only carry one FH link. However, this will result in enormous fiber resource consumption, making this scheme realistic only to operators with abundant fiber resources or in scenarios where fiber deployment is cheap. Another option is to multiplex FH links into a single fiber core using wavelength-division multiplexing (WDM), but WDM modules are still much more expensive than black and white modules.

Stringent latency constraints: Wireless signal processing often has stringent latency constraints. For example, the LTE hybrid automatic repeat request (HARD) process leaves a latency budget of 3 msec for the decoding of each radio subframe. Because subframes need to first be transported from RRHs to BBUs before being processed, the transportation latency should also be counted into this latency budget. Excluding the portion necessary for signal processing (about 2.5 msec), there are only 300 to 500 msec left for FH transportation, ruling out any switching-based technologies that will incur excessive latency [2]. Moreover, some future 5G communication scenarios demand even stricter latency constraints: for sub-millisecond wireless access, the latency budget for FH transportation will be so small that any long-range transportation may be prohibited.

Tight synchronization requirements: Many RRHs cannot generate an accurate clock by themselves, either because GPS receivers are too expensive to be integrated into RRH or due to satellite signal blockage in indoor environments. For this reason, FH must deliver synchronization information from BBUs to RRHs. In CPRI links, clock information is carried in the waveform (pulse edges) of the transported signal. But the underlying network infrastructure may introduce jitter to the waveform, leaving degraded communication performance. The importance of tight synchronization will be even greater in 5G networks because of the massive cooperation between access nodes. If cooperating access nodes have frequency offset, their transmitted signals will overlap at UE, and will not be able to be separated and individually compensated, causing distorted beamforming patterns and degraded performance.

All functionalities except RRU (PHY/MAC/RLC/PDCP) are located in a central facility and a high bitrate/low latency front haul connect CWSs to HNG. Although Parallel Wireless solution will support this case, it is not the preferred solution due to cost and CPRI like fronthaul requirements.

Parallel Wireless's CWS, VRU, and HNG products are naturally equipped to support Split 8. Our CWS is composed of an integrated radio front end that serves as a DU which is responsible for antenna to baseband down-conversion (and baseband to antenna up-conversion). Our CU is comprised of highly scalable general-purpose processors and FPGAs that contain the LTE protocol stack along with the LTE baseband processing to support multiple high-capacity LTE carriers (i.e., 3 to 6 sectors, 20 MHz, 4×4). The interface between the DU and the CU is a standard CPRI.

With Split 8 we can seamlessly support many high-end LTE features such as CoMP, massive MIMO, and load balancing in a highly mobile radio environment. Our split 8 option allows for centralized traffic aggregation from NR and E-UTRA which in turn enables us to smoothly migrate from the LTE ecosystem to the NR ecosystem. Since virtually all of the LTE protocol stack runs on the CU over GPP/FPGAs, by leveraging statistical multiplexing of compute resources we could enable energy efficient radio resource management. As the DU and CU are split at the RF component levels, changes in the PHY and protocol stack are better managed and RF components can be shared across the RAN technologies and also be easily upgraded.

For Split 8, due to the RF and protocol stack separation, the transport requirements go linearly with the number of supported antenna ports. With 8 antenna ports per 20 MHz carrier, the transport requirements are 9.8304 Gbps per direction (CPRI Rate-7) whereas with 12 antenna ports this rate increases to 12.1651 Gbps (CPRI Rate-9). We believe our next generation DU and CU with PCIe (3.x, 16 lanes) comfortably support these transport requirements.

The one-way latency with Split 8 is expected to be around 250 micro sec.

As our Split 8 is based on the industry-standard CPRI, our CU and DU are interoperable with third party CU/DUs.

The main advantages of split 8 are that the baseband resources are centrally pooled and the RF and PHY are decoupled. These allow us to scale the network to accommodate many sectors, multiple channel bandwidths and pave the way for massive MIMO operation. Interference mitigation, coverage expansion, joint transmission and reception, supporting a large UE count in both UL and DL, and energy-efficient radio resource management are some of the biggest advantages of split 8. Software-centric and commodity HW further make this split very attractive from the cost reduction standpoint.

The central drawback of split 8 is that the fronthaul (the link between CU and the DU) data rate and latency requirements grow with the number of antenna ports. The fronthaul latency is expected to be within 250 microsec as recommended by the 3GPP 38.801 technical report whereas the fronthaul rate could be as high as 160 Gbps with 100 MHz channel bandwidth and 32 antennas.

Our split 8 DU consists of a radio front end with optional PA (power amplifier) pre-conditioning functionality (DPD and CFR; DPD: digital pre-distortion and CFR: crest factor reduction). The DPD and CFR can be implemented on an industry-standard FPGA. As a result, GPP processing is minimal (to around 10-20%) in the DU. On the other hand, our CU consists of the entire LTE protocol stack (which includes the Layer 1 PHY together with the MAC/Scheduler/RRM etc). The layer 1 PHY is implemented in both GPP (channel estimation, equalization, layer mapping, MIMO precoding etc) and FPGAs (decoder acceleration).

Our CU portion of the split 8 solution leverages both GPP and FPGAs. We employ RTOS to orchestrate the HW resources running on the FPGA for Layer 1 PHY processing. The same RTOS is also powering our scheduler, MAC, RLC, PDCP, RRC and RRM functionality in the higher layers of the protocol stack. Our GPPs can be commodity server chips based on x86 architecture and the SW can run on a version of real-time Linux.

Path to 5G

Parallel Wireless believes its existing 4G solution is well positioned to create a seamless evolution path toward 5G. While new 5G radios can easily added to CWS, our VRU and HNG can act as aggregator and can also provide different functionality based on appropriate splits. Also, Parallel Wireless HNG can act as an aggregation point toward 5G core network and manages all network slicing based on Network Slice Selection Assistance information (NSSAI) and manage all related gNB and reducing core network signalling dramatically. This approach can provide continuity for mobile operators 5G role out by utilizing a single aggregator as anchoring point toward their 4G and 5G by utilizing a single HNG. This will provide the path to gradually retire CU physical equipment and create a simpler architecture purely based on CWS and HNG.

Figure 10:
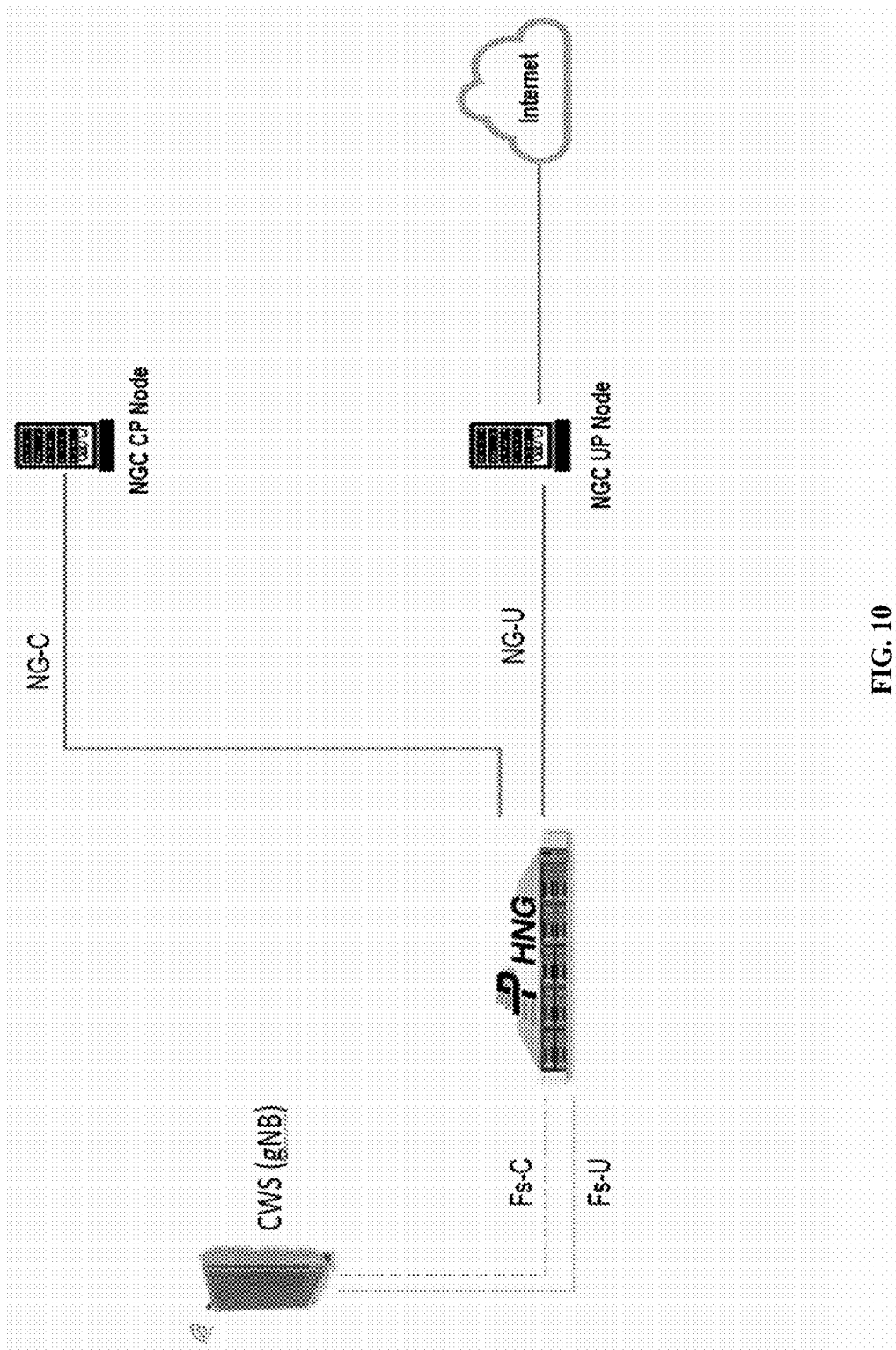
FIG. 10 is a diagram showing Fs-C and Fs-U interfaces toward a RAN, in accordance with some embodiments.

Because of utilizing HNG, Parallel Wireless solution can utilize any split type based on different deployment scenarios. It provides a complete separation between Control Plane (CP) and User Plane (UP) and makes it possible for UEs to connect to multiple transmission points simultaneously. HNG will centralize all CP related functions toward 5G RAN; and 4G RAN, controlling different transmission nodes and achieves enhanced radio performance. Parallel Wireless will comply with future 3GPP standards by utilizing Fs-C and Fs-U interfaces toward RAN therefore gNBs from different vendors can also be connected to HNG and managed by it. This will reduce overall control and signalling traffic toward the core network and improve overall radio network performance. This is shown in FIG. 10.

The future evolution of RAN will be toward dynamic functional splits. While an aggregator acts as a mediator between RAN and core network, the functionality of the RAN will be distributed between DUs and CUs. In different scenarios, these elements can collapse together and create a single physical entity with different virtual functionalities.

The centralized baseband deployment is initially proposed to allow load-balancing between different base stations. Therefore, in most cases DU will be collocated with RRH to conduct all computationally intense processing tasks such as fast Fourier transform/inverse fast Fourier transform (FFT/IFFT) which are not load dependent and exhibit no sharing gains. CU can be separate or collocated with the aggregator depending on FH availability.

Same as Parallel Wireless 4G solution, our 5G solution will support a dynamic split approach based on deployment scenarios. For the rural deployment, with lower number of users, low traffic and less than perfect fronthauls, option 1 split between HNG (RRC) and CWS (PDCP/RLC/MAC/PHY/RF) is the most desirable solution. Whereas in dense urban areas option 6 split between HNG (RRC/RLC/MAC) and CWS (PHY/RF) can be a better solution.

Figure 11:
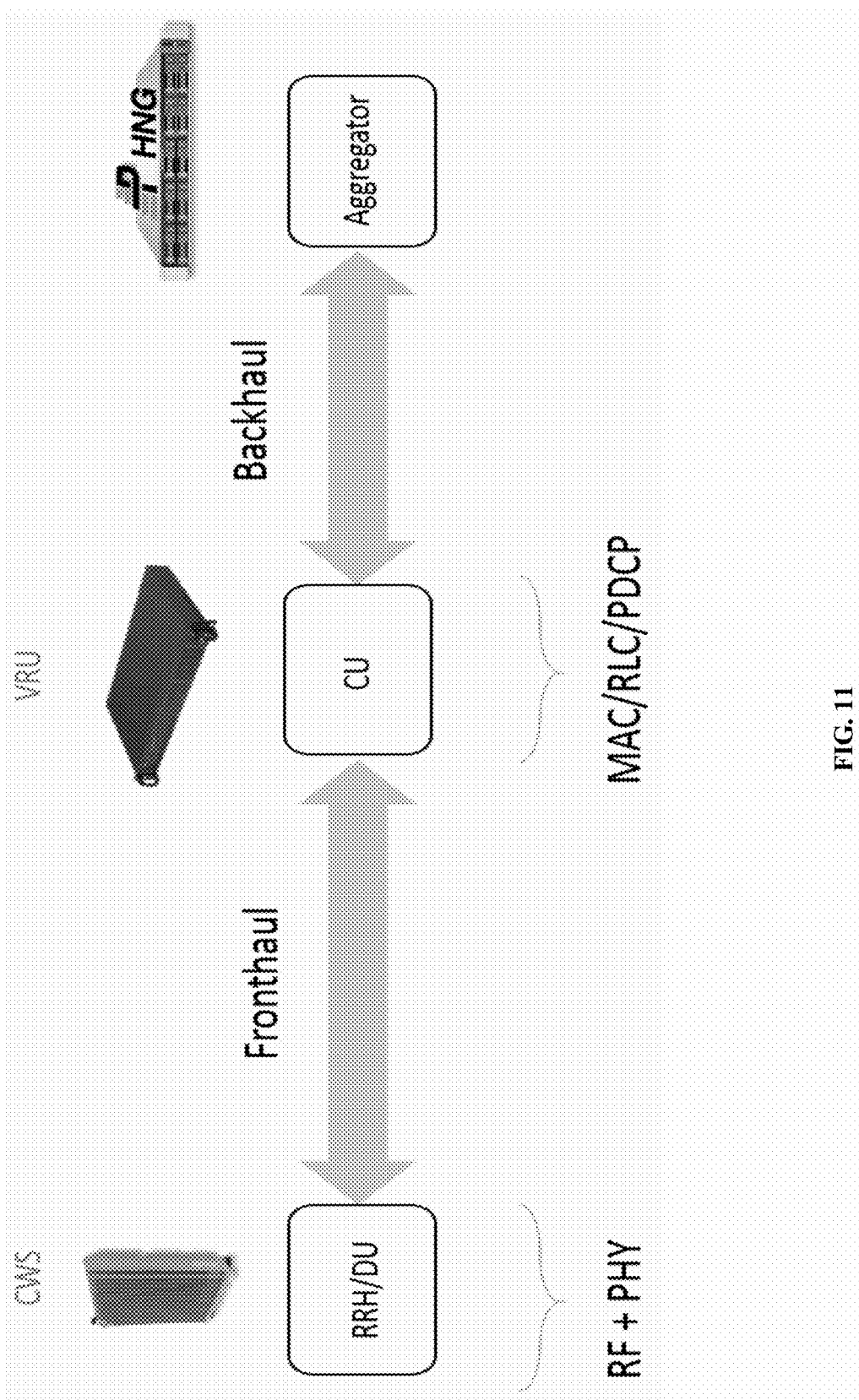
FIG. 11 is a diagram showing a VRU to HNG as an aggregator in accordance with some embodiments.

The Parallel Wireless CWS already provides RRH and DU functionality in one unit. It will be easy to deploy any of the discussed splits due to this availability. We believe split 6 will be the best approach going forward for deploying future mobile network in different environments and morphologies. While its requirements for fronthaul is not as restricted as split 8, by utilizing Virtual Radio Unit (VRU)[1] our solution can support traffic in a dense urban area while maintaining a less than perfect backhaul to connect this local VRU to the HNG as aggregator. In some figures or portions of this disclosure the VRU may be referred to as a VBBU (virtual baseband unit). This is shown in FIG. 11.

Also, for rural areas where there is no reliable and high capacity fronthaul availability, the local VRU connection to CWS will utilize a close to perfect fronthaul since they are in close proximity and utilize less than perfect backhauls (e.g. satellite links) to connect the VRU to the HNG. All these scenarios will be discussed in detail in the following sections.

Parallel Wireless's innovative and flexible approach makes the distribution of functions and different splits easy to implement. The main components will be our HNG and CWS, however the functionality distribution between CU and DU can be configured based on requirements. The CU can be located at colocation facilities, while DU will be our CWS. Split 6 in this case will be the most suitable option, however Parallel Wireless solution can utilize all other defined splits as well. By this split, latency requirements for FH are not as restricted as splits 8 or 7.

Figure 12A:
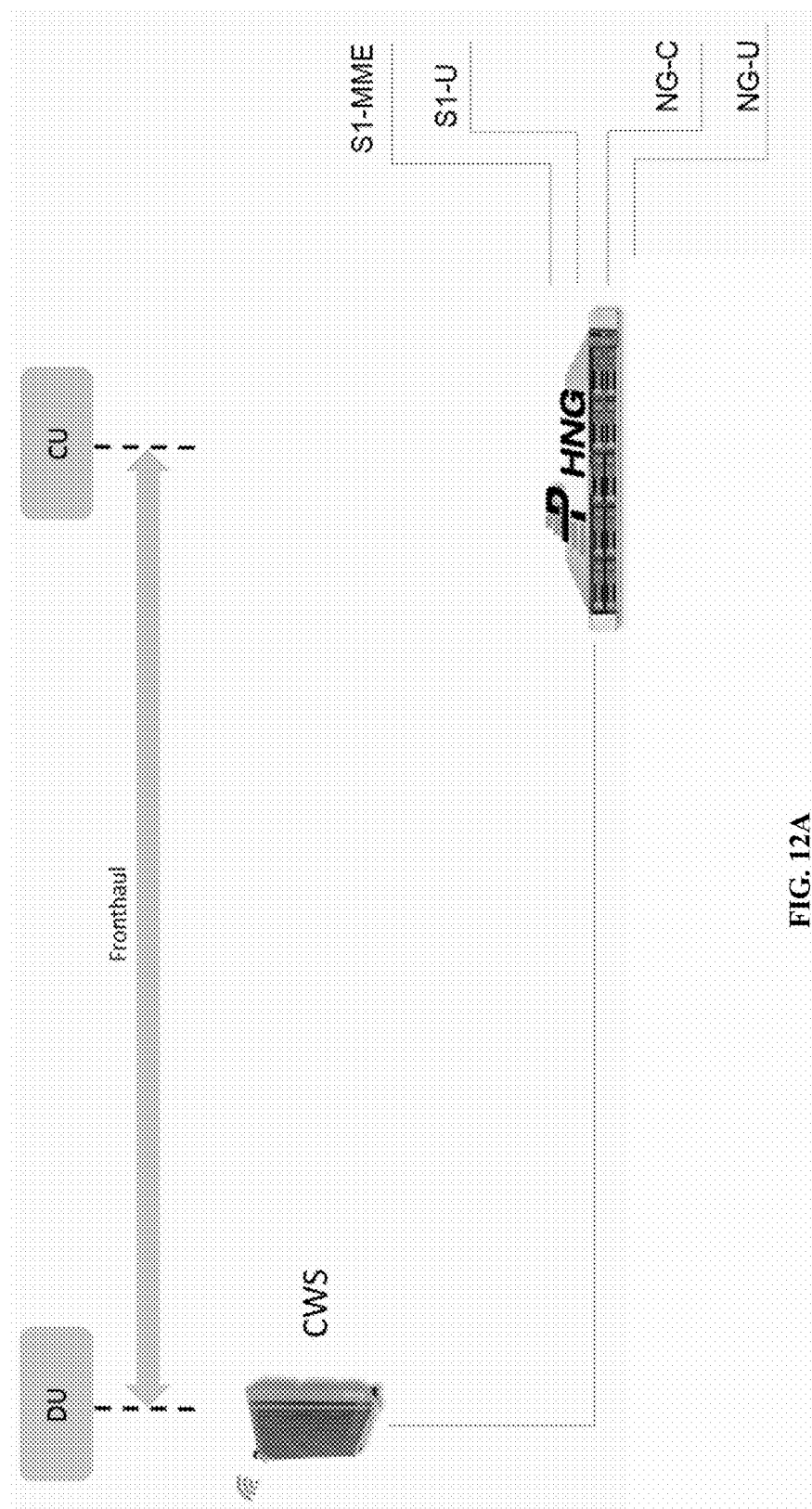
FIGS. 12A and 12B are a diagram showing a solution based on split 6 in accordance with some embodiments.
Figure 12B:
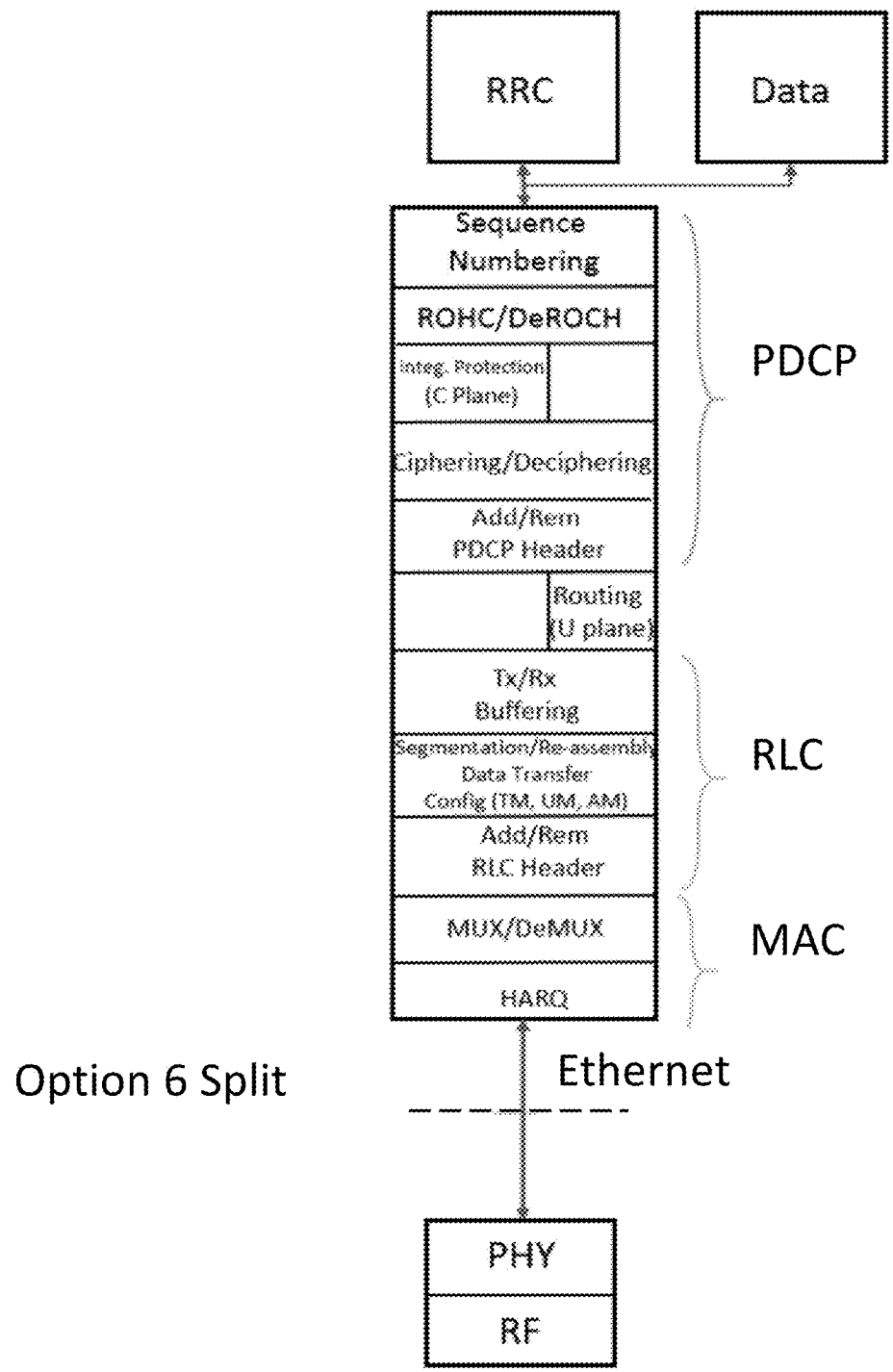

Although Parallel Wireless supports option 7.1 split of 3GPP, we believe for dense urban scenarios when near perfect FHs are available, split 6 provides a better diversity gain. Pushing IFFT/FFT to DU will relax requirement for FH, but still it requires a near perfect FH which can be challenging in many deployments. This is shown in FIGS. 12A and 12B.

Parallel Wireless has understood that it is a significant advancement to be able to dynamically change the functional split and distribute functionalities/network elements based on capacity/latency of fronthaul. A new network element, VRU (Virtual Radio Unit), is introduced that can continuously evaluate the fronthaul capacity/latency, via communication with base stations, and dynamically allocate, enable and utilize protocol stacks on CU and RU to match the available fronthaul capability at any time. In some figures or portions of this disclosure the VRU may be referred to as a VBBU (virtual baseband unit). This is enabled by our modular architecture, and by the fact that our GPP/FPGA HW at our CWS can provide enough horsepower to run protocol stacks at the edge as well as at a centralized node. Additionally, the VRU can provide auxiliary baseband processing capability to supplement, augment, and load-balance a plurality of managed CWS nodes. Multiple VRUs may be used in the network. The VRU may be located in the network physically close to the RAN and in a network-proximate location to the RAN, and may operate in conjunction with the HNG, which may be located at the core network edge. The HNG may coordinate multiple VRUs as well as multiple CWSes.

Further, using the SON manager at the HNG, which enables self-configuration, a dynamic software-based radio can be enabled that can that configure each network element protocol stack (our CWS directly, or via VRU) based on the current morphology. Specifically, not only are changes in configuration contemplated, like legacy SONs, but rather, we configure each network elements protocol stacks as required.

Our solution includes a modular software base, that give us the opportunity to dynamically allocate the modules (layers) that we need to each HW component (CWS or VRU). We consider PHY, MAC, RLC and PDCP as four different software modules. Our CWS GPP and our VRU hardware can process each module based on how we split them and load them. In split 6 for example, we let CWS run PHY while other 3 modules (layers) will be run on VRU hardware. We can dynamically change these splits based on morphology and availability of fronthauls at the time of deployment, or change them later on. Likewise, for split 2, we keep PDCP at the HNG and push all other layers to the CWS. We believe the concept of pure RRU (just dumb radio at the edge) is not scalable due to high throughput (+2 Gbps) and very low latency (less than 250 micro sec) fronthaul requirement. We can interoperate with our own or third party hardware, either radio for CWS part or COTS server for VRU, and the coordinating node can sit in the middle and decide how much to load to each radio and run the rest at the gateway (HNG).

Further details regarding specific functional splits is below.

Parallel Wireless has already deployed 4G networks across the globe based on option 1 split between HNG (RRC) and CWS (PDCP/RLC/MAC/PHY/RF). Also, option 6 split between HNG or VRU (RRC/RLC/MAC) and CWS (PHY/RF) is an available alternative. In this case, PHY layer and RF will reside in CWS (acting as the 3GPP distributed unit, or DU) and all other functionalities remain in VRU (acting as the centralized unit, or CU, and Aggregator). The interface between CWS (DU) and VRU (CU/Aggregator) will carry data, configuration and scheduling related information including MCS and resource block allocations. This option makes joint transmission and inter layer coordination feasible. However, as mentioned previously, Parallel Wireless system can utilize other split options if it is required.

Because of our HNG anchoring capabilities, the same approach (like 4G) is applicable. Parallel Wireless has already deployed 4G networks across the globe based on option 1 split between HNG (RRC) and CWS (PDCP/RLC/MAC/PHY/RF). Also, option 6 split between HNG/VRU (RRC/RLC/MAC) and CWS (PHY/RF) is an available alternative. In this case, PHY layer and RF will reside in CWS (DU) and all other functionalities remain in VRU (CU/Aggregator). The interface between CWS (DU) and VRU (CU/Aggregator) will carry data, configuration and scheduling related information including MCS and resource block allocations. This option makes joint transmission and inter layer coordination feasible. However, as it mentioned before, Parallel Wireless system can utilize other split options if it is required.

This is Parallel Wireless's 4G innovative approach. Parallel Wireless has successfully deployed its 4G solution based on split 1 and utilizing access schema split 0 across the world. Parallel Wireless has already deployed 4G networks across the globe based on option 1 split between VRU (RRC) and CWS (PDCP/RLC/MAC/PHY/RF).

Figure 13A:
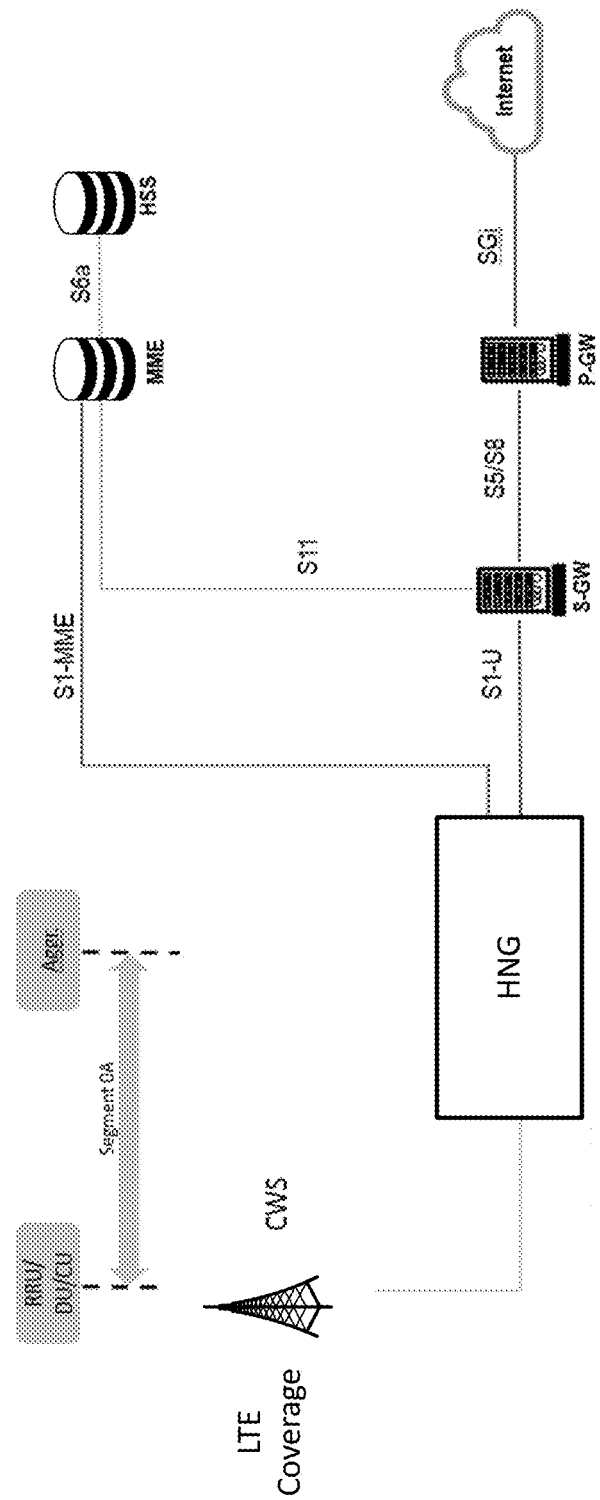
FIGS. 13A and 13B are a diagram showing a solution based on split 1 in accordance with some embodiments.
Figure 13B:
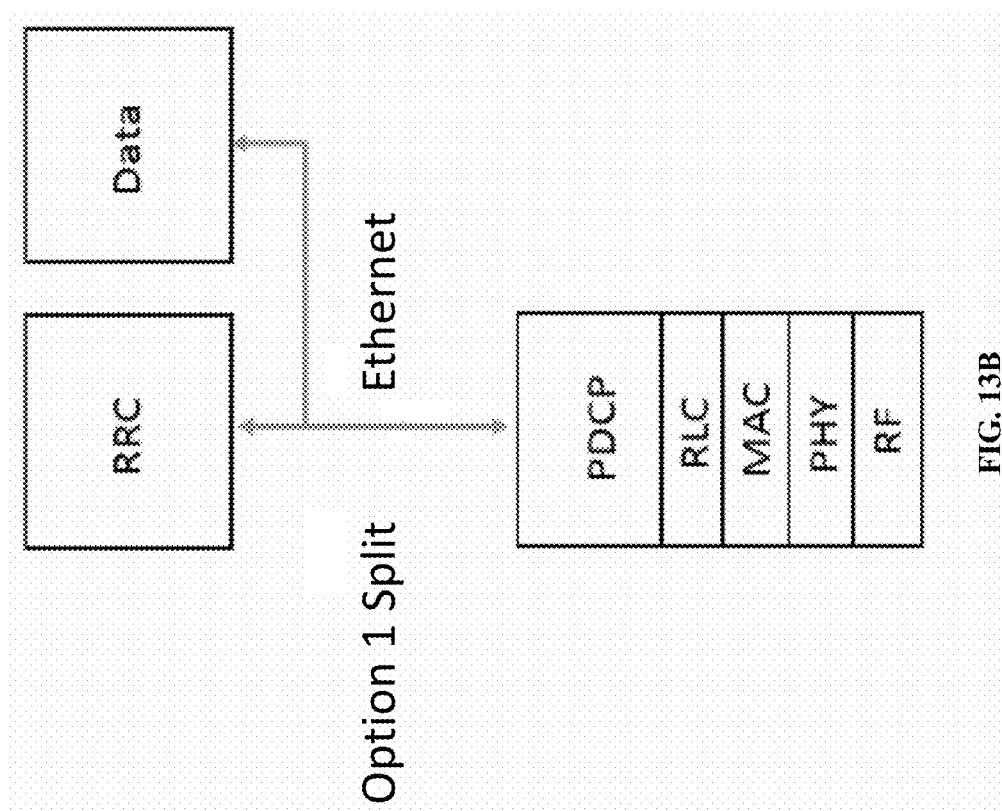

Same approach is applicable for 5G and Parallel Wireless utilize it based on following figure. This is shown in FIGS. 13A and 13B.

Figure 14A:
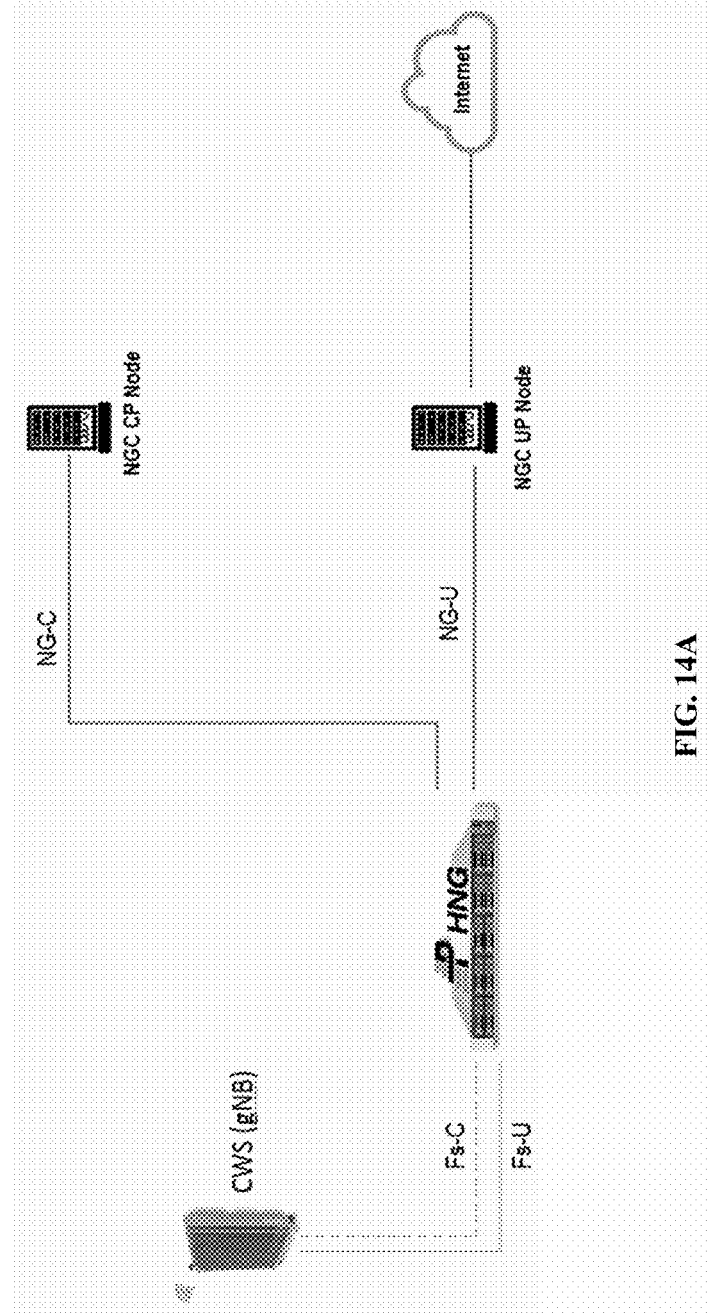
FIGS. 14A and 14B are a diagram showing a solution based on split 1 in accordance with some embodiments.
Figure 14B:
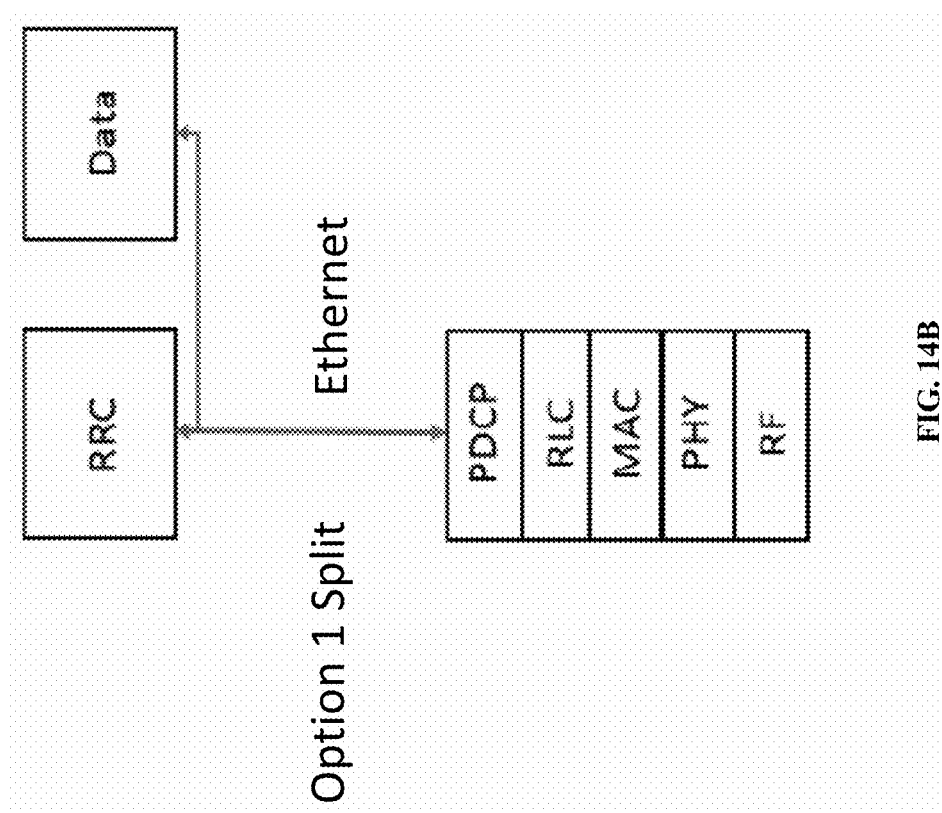
Figure 15A:
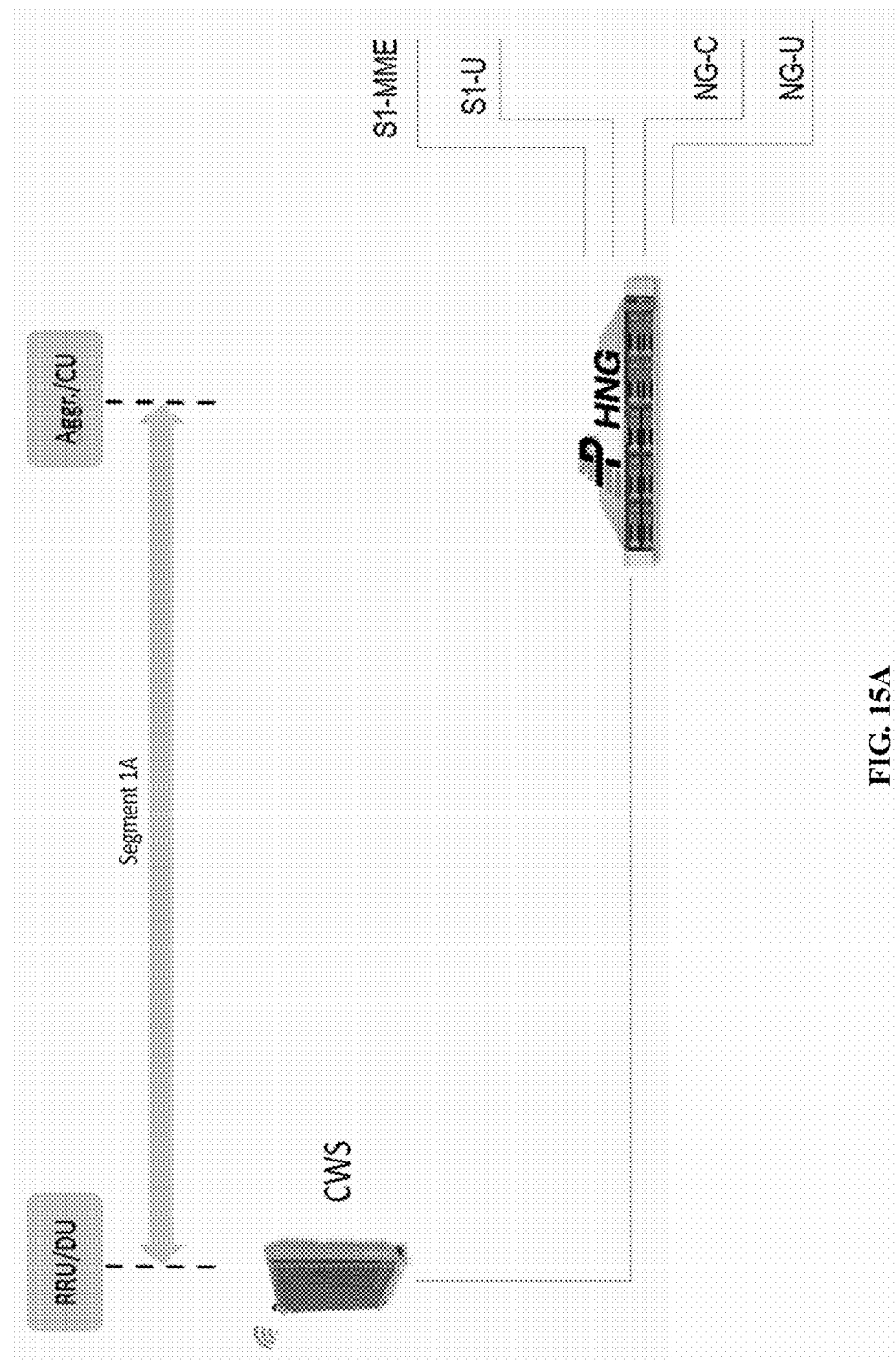
FIGS. 15A and 15B are a diagram showing a solution based on split 6 in accordance with some embodiments.
Figure 15B:
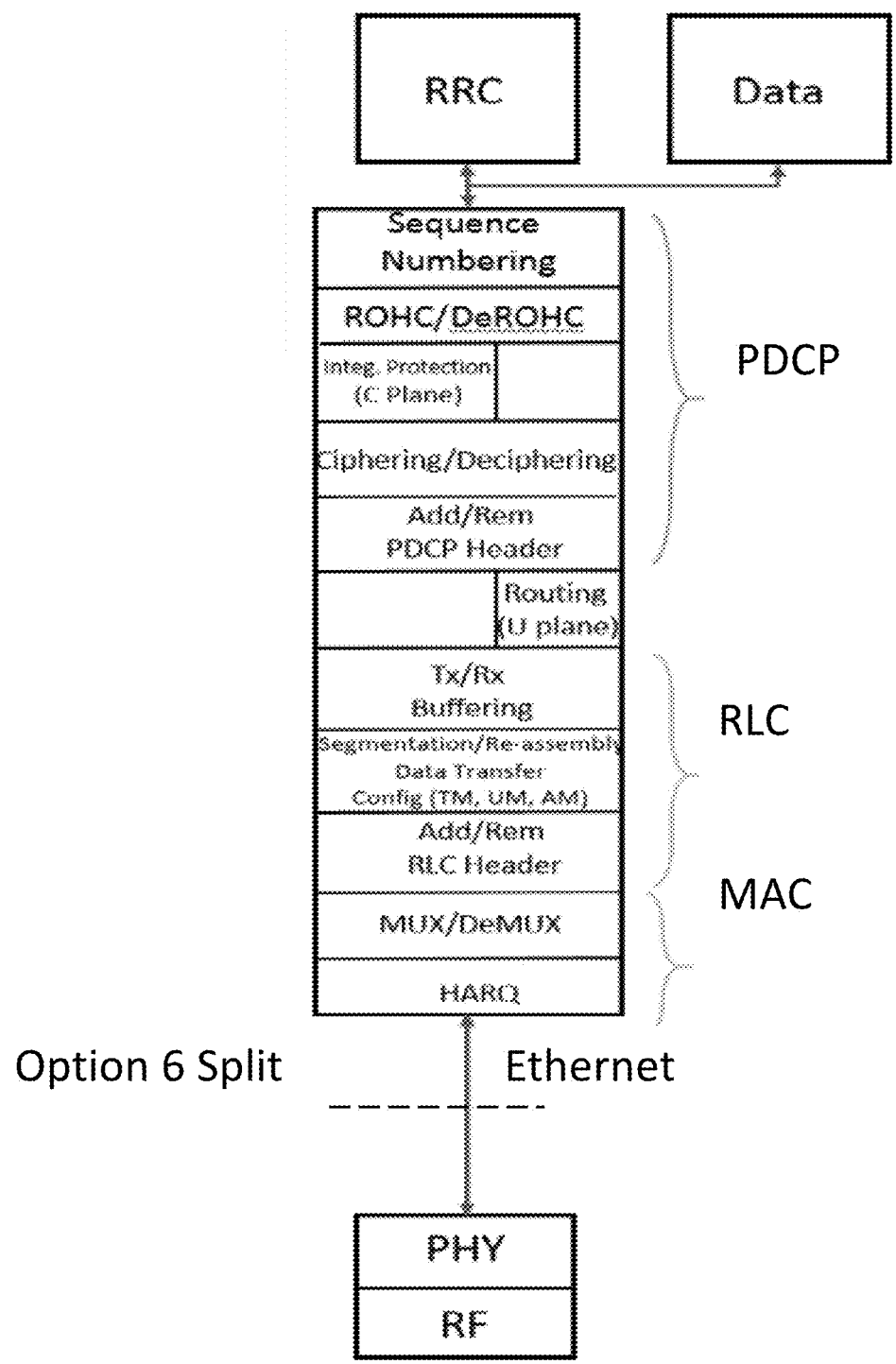

Parallel Wireless's innovative and flexible approach makes the distribution of functions and different splits easy to implement. The main components will be our VRU and CWS, however the functionality distribution between Aggregator, CU and DU can be configured based on requirements. For case one, the aggregation of Aggregator and CU can combine and perform at colocation facilities, e.g., at a VRU, while RRU/DU will combined in our CWS. Split 6 in this case will be the most suitable option, however Parallel Wireless solution can utilize all other defined splits as well. While Aggregator and CU can utilize same hardware or different hardware, they will be collocated. By this split, latency requirements for Segment 1A are not as restricted as splits 8 or 7. This is shown in FIGS. 14A and 14B and also in FIGS. 15A and 15B Parallel Wireless believes Case 2 will not bring much value when compared to Cases 1 and 3. Separation of RRU and DU requires low latency and high throughput for Segment 2A, while separation of PHY (including IFFT/FFT) from RRU to make it centralized for multiple RRUs does not have any benefit. Most of the PHY functionalities (specifically IFFT/FFT) are not load related, therefore there will be no load balancing gain.

Parallel Wireless envision this scenario for the scenarios where multiple CWSs deployed in areas and a single VRU (hosting DU/CU) with close physical proximity to them will deployed to control them. This can be the case when fronthaul availability is limited to short distances and VRU needs to be close to CWSs. In this case a split 6/7 is feasible at the remote VRU.

Parallel Wireless supports option 7.1 split of 3GPP. This is a very efficient and practical PHY split, considering IFFT/FFT are not load dependent and add no sharing gain by accommodating it in the CU. All other PHY functionalities including coding, modulation, layer mapping and precoding will be located at the CU while IFFT/FFT and CP addition/removal and Radio will be collocated at the DU. Our CWS and VRU products are naturally equipped to support Split 7.1 as discussed before. Our CWS is composed of an integrated radio front end that serves as a DU which is responsible for antenna to baseband down-conversion (and baseband to antenna up-conversion) and IFFT/FFT and CP addition/removal. VRU will host all other parts of the stack as the CU.

Figure 16A:
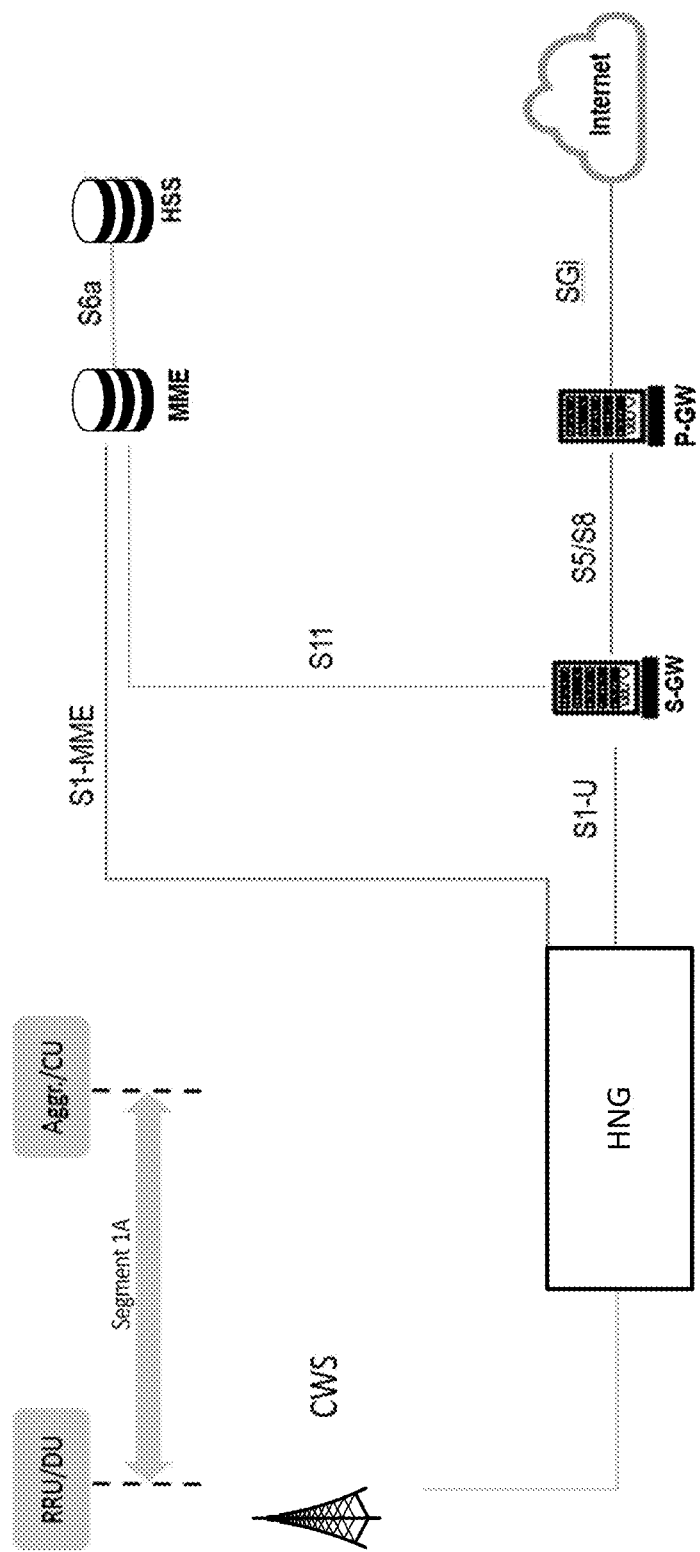
FIGS. 16A and 16B are a diagram showing a solution based on split 7.1 in accordance with some embodiments.
Figure 16B:
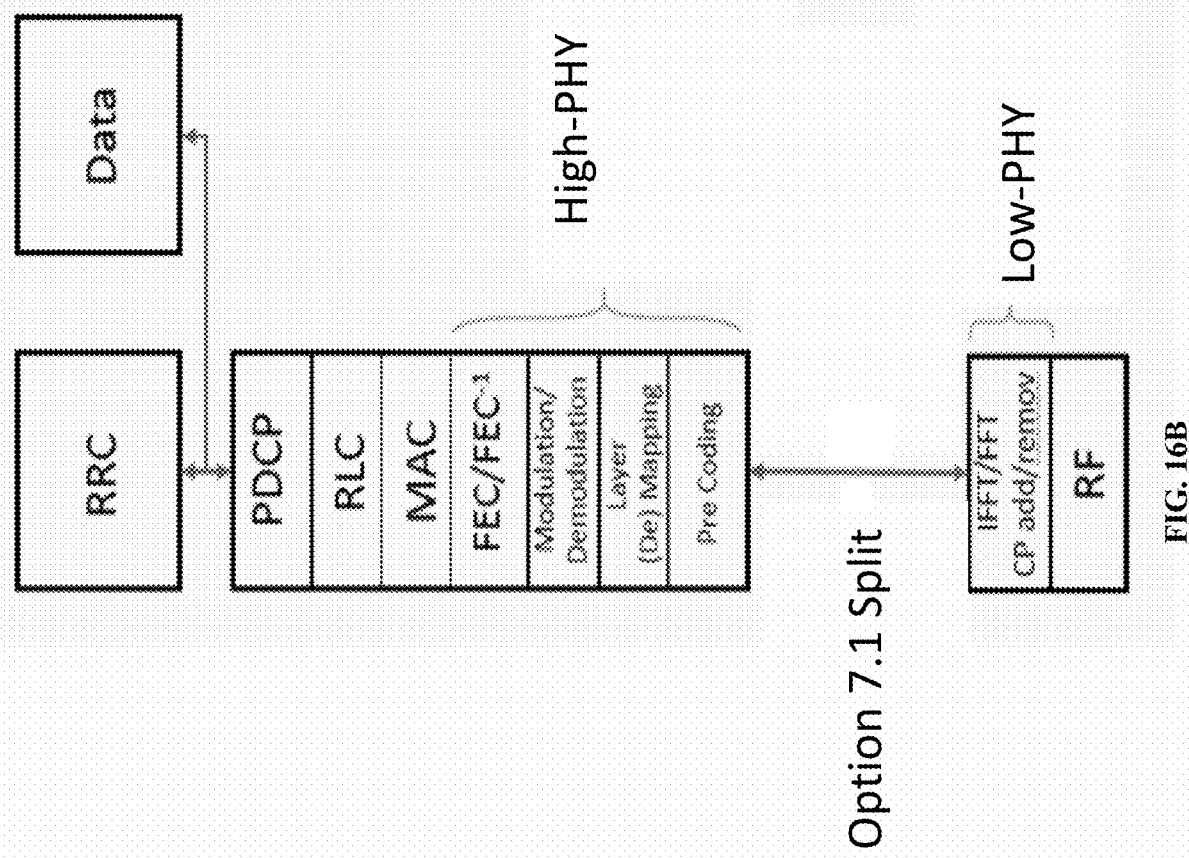

Considering IFFT/FFT and CP addition/removal, the only parts of overall protocol stack which are not load dependent and they are in DU for split 7.1, this split can be utilized for extreme load balancing scenarios. For morphologies and geographical areas with very non-uniform peak loads, this split can exhibit maximum sharing gain. This is shown in FIGS. 16A and 16B.

DL

For a 20 MHz channel, 256QAM and 8 layers the required bitrate is:

100 (PRB)×12 (no of subcarriers per PRB)×14 (symbols)×8 (bits per symbol)×8 (layers)×2 (I/Q)/1×10-3 (one subframe)=2.15 Gbps

UL

For a 20 MHz channel, 64QAM and 8 layers the required bitrate is:

100 (PRB)×12 (no of subcarriers per PRB)×14 (symbols)×6 (bits per symbol)×8 (layers)×2 (I/Q)/1×10−3 (one subframe)=1.61 Gbps For split 7.1 the fronthaul needs to support 3.76 Gbps bidirectional The one-way latency of 250 microseconds is expected for split 7.1 option.

Parallel Wireless complies fully with 3GPP standards. Therefore, any vendor with standard IFFT/FFT and CP addition/removal (Low-PHY) can be connected to the Parallel Wireless CU (HNG).

Low latency and high throughput requirements for split 7.1 may be an issue for connecting DUs to CU. However, this split is one of the best options to take advantage of sharing gain and utilize different peak load rates across the network.

As it described in our previous responses, a majority of the load-related processing in this split is collocated with CU (VRU), while less load-dependent processing (FFT/IFFT) is collocated with DU (CWS).

Our CU portion of the split 7.1 solution leverages both GPP and FPGAs. We employ RTOS (real-time operating system) at the CU to orchestrate the HW resources running on the FPGA for Low-PHY processing. Therefore, there will be enough processing power to support this split in our DU. The same RTOS is also powering our scheduler, High-PHY, MAC, RLC, PDCP, RRC and RRM functionality in the higher layers of the protocol stack. Our GPPs are commodity server chips based on x86 architecture and the SW runs on real-time Linux.

For deployment in dense urban areas, Parallel Wireless recommends split 6, in order to keep RF and PHY at CWSs and using less than perfect fronthauls to connect them to VRU which hosts PDCP, RLC, and MAC as the centralized unit. Both CWS and VRU support this split and can be utilized for deployment.

Figure 17A:
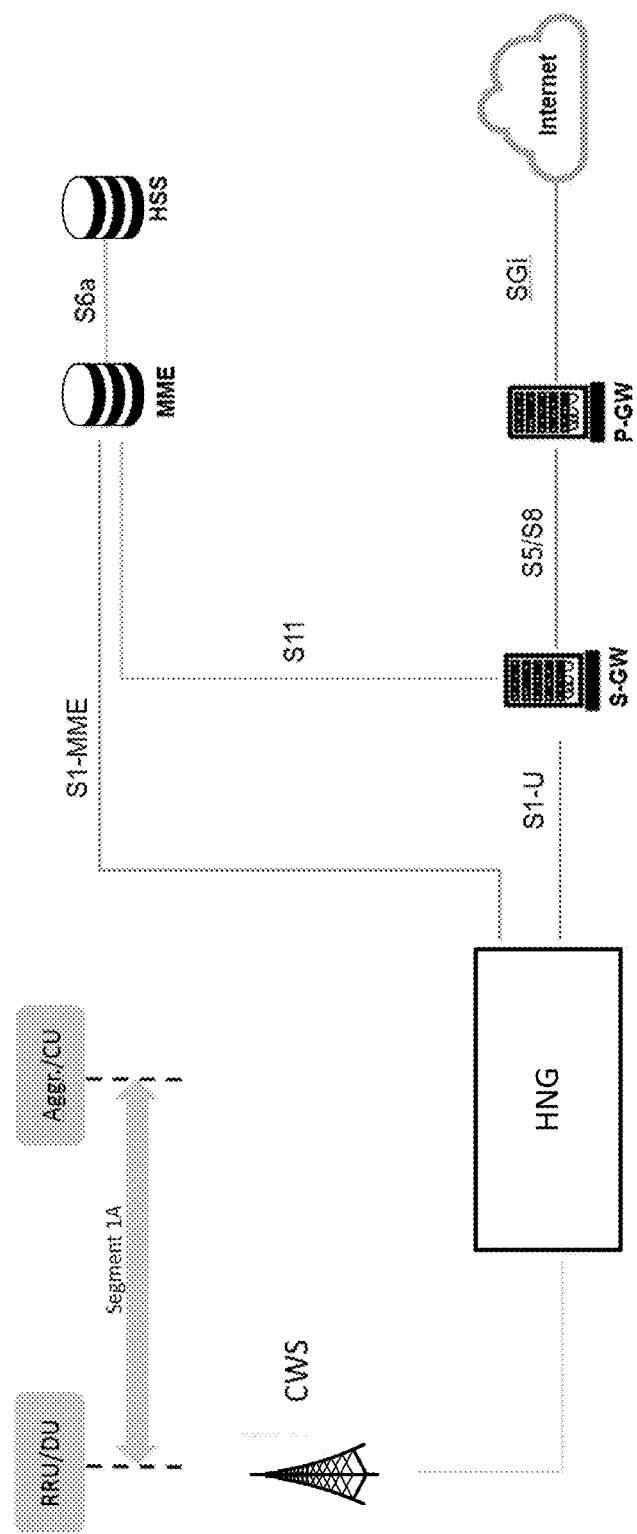
FIGS. 17A and 17B are a diagram showing a solution based on split 6 in accordance with some embodiments.
Figure 17B:
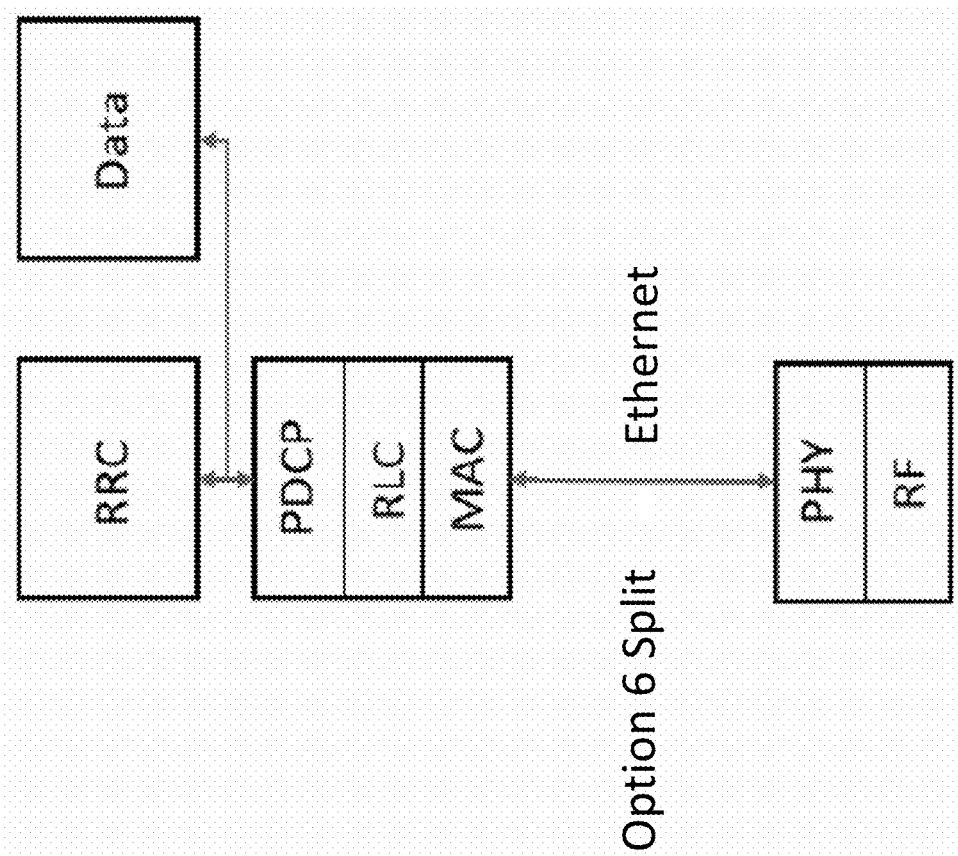

Legacy centralized baseband (split 8) in most cases promises load balancing between sites, taking advantage of the fact that peak loads do not occur uniformly. However this must be balanced against any increase in the cost required to achieve the load balancing, e.g., for switching radio traffic between different processors. Field studies have found that a relatively small number of base stations still provide good heterogeneity, and that most of the potential for load balancing gains can be leveraged with about 20 sites. In addition, certain "computationally expensive" processing tasks such as fast Fourier transform/inverse fast Fourier transform (FFT/IFFT) are not load dependent and exhibit no sharing gains. Also, considering HARQ management at the MAC level is one of the most traffic related processes it will be beneficiary to utilize split 6 for scenarios where there are sites with different demographics (e.g., business and residential) and less than perfect backhauls in terms of latency (around 8 msec RTT). This is shown in FIGS. 17A and 17B.

Based on 3GPP TS 36.213 for DL, 8 layers, 256QAM, the TB bits are 391656 (per TTI) therefore the maximum DL through put will be 391 Mbps. For uplink, assuming category 17/19 (supporting 256QAM) the UL TB bits are 211936 (per TTI) therefore the maximum UL through put will be 212 Mbps.

Considering the 30% overhead, the maximum bi-directional link capacity for split 6 will be: (391+212)*1.3=784 Mbps Considering the 8 msec RTT requirements, standard 1G WAN connections would be sufficient for split 6 fronthaul.

For calculating the required RTT for this split, we must look into HARQ timing for PRACH and regular data transmission. For the PRACH, eNB is required to answer to the UE within a configurable random-access response window. This window starts three subframes after the last subframe with the respective preamble transmission and has a configurable length between two to ten subframes. Considering the shortest duration for two subframes (2 msec), the UE must receive its response before 4 msec. Considering maximum ranges for LTE (100 Km) and its related timing advance (0.67 msec) and about 1.5 msec for processing time at the CU, it left us with 2 msec RTT for latency between MAC and PHY. Therefore, a maximum one-way latency of 1 msec is required for this split.

The standard synchronous transmission and ACK messages which have 8 msec (8 subframe after the initial one) delay budget will not be a dominant factor for this requirement.

Parallel Wireless complies fully with 3GPP standards. Therefore, any vendor with standard PHY interface (and standard RF) can be connected to Parallel Wireless CU (HNG).

Because FFT/IFFT are very "computationally expensive" processing tasks and not load dependent (they don't provide any sharing gain), Parallel Wireless believes combining PHY and RF units (split 6) is one of the most efficient splits.

As it described in previous questions, majority of the load related processing in this split is collocated with CU (HNG), while less load dependent processing (including FFT/IFFT) is collocated with DU (CWS).

Parallel Wireless supports multiple split options with a goal of providing greater flexibility in system deployment while at the same time improving latency and reliability. The Split 6 solution requires that the radio is collocated with PHY, whereas the CU contains MAC, RLC, RRC and PDCP. Our CU functionality is aggregated across multiple sectors/sites and is realized through a GPP solution. Our GPP components include, but are not limited to, multi-core processors with real-time operating system and optional FPGA-like processing modules to offload compute-intensive operations such as PDCP ciphering, RRC AS SRB integrity protection and SRB/DRB ciphering, and deep packet inspection as part of our application intelligence. Also, all layer 2 functionalities, including HARQ scheduling is located at CU. This will utilize load balancing and take advantage of the fact that peak loads not occurs uniformly across sites.

Parallel Wireless's DU solution for Split 6 also involves GPP along with FPGAs to accelerate the layer 1 (PHY) processing. Some of the baseband functionality such as channel estimation, equalization, MIMO precoding/decoding, and time/frequency-domain scheduling are implemented in the GPP whereas the processing intensive operations such as Turbo decoding are implemented in the FPGAs.

Option 2 split is recommended for deployment in dense urban areas with non-ideal backhaul. In the Parallel Wireless Solution Option 2 split could be realized with RRC, S1-U (data) and PDCP functions to be co-hosted with the VRU and the Lower layers RLC, MAC and PHY on the CWS. This option allows some part of the stack to be virtualized. The PDCP RLC split is already standardized in the LTE dual connectivity.

Figure 18A:
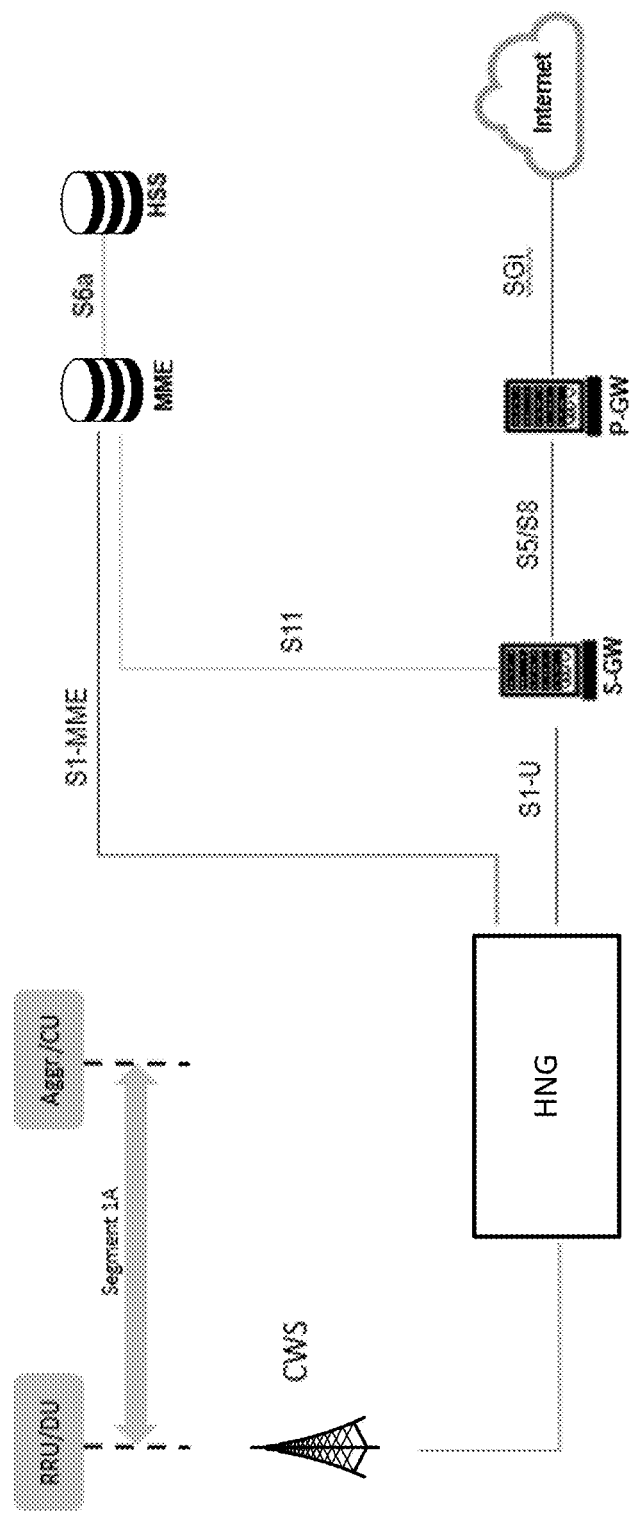
FIGS. 18A and 18B are is a diagram showing a solution based on split 2 in accordance with some embodiments.
Figure 18B:
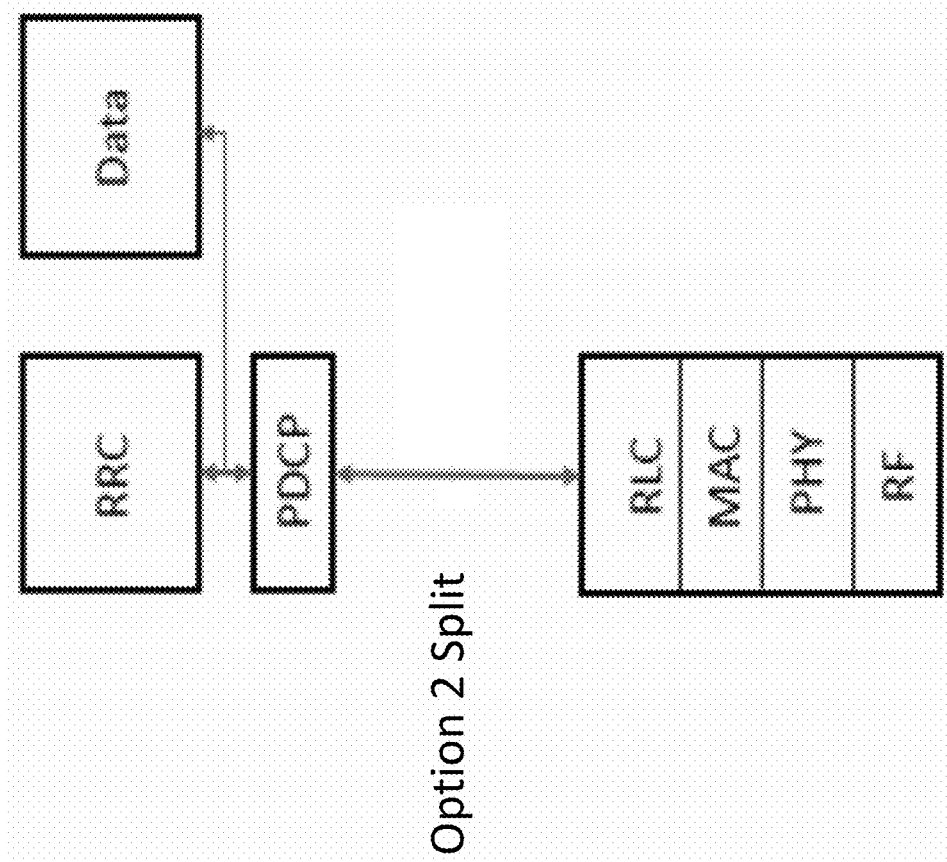

This option would be ideal in case the backhaul is unable to ensure latency/jitter requirements of some of the lower split options and in implementation would mean a very straight and clean split. The overhead of traffic is also minimal and is comparative to non-split fronthaul requirements. Option 2 split enables virtualization of some part of the stack function and also provides the option to reduce processing overheads on the RRH or DU. Another advantage of this split option, especially with Parallel wireless solution, is the Dual Connectivity will be very efficiently implemented and back routing of data packets over the X2 interface is avoided. Since the VRU/HNG is close to EPC there is significant overhead reduction in packet routing when Option 2 split is implemented with the VRU/HNG. This is shown in FIGS. 18A and 18B.

This option could be further enhanced to separate the RRC to the CP stack and PDCP to the UP stack which enables scaling of the user plane load.

Based on 3GPP TS 36.213 for DL, 8 layers, 256QAM, the TB bits are 391656 (per TTI) therefore the maximum DL through put will be 391 Mbp. For uplink, assuming category 17/19 (supporting 256QAM) the UL TB bits are 211936 (per TTI) therefore the maximum UL through put will be 212 Mbps.

Considering the 5% overhead, the maximum bi-directional link capacity for split 2 will be: (391+212)*1.05=637 Mbps This Option latency requirement is similar to non-split versions and minimum latency could be based on the application and control plane latency requirements. For instance, if Control plane latency needed to have Idle to Connected mode transition in 100 msec and the access side procedures need 60 msec for the air interface messages, minimum latency required could be de-rived based on Number of Control Messages exchanged between RRC and MAC/PHY and RTT for each message so that this doesn't exceed 10 msec duration.

Parallel Wireless complies fully with 3GPP standards. Therefore, any vendor with standard RLC interface can be connected to the Parallel Wireless CU (HNG).

Considering the fact that HARQ is directly related to the cell user traffic, this split will provide a very high sharing gain. If the peak times do not occur uniformly across the network, this split can be one of the best candidates.

HARQ and other parts of the stack above the MAC layer will be the major consumer of baseband processing in this scenario.

Parallel Wireless supports multiple split options with a goal of providing a greater flexibility in system deployment while at the same time improving the latency and reliability. The Split 2 solution requires that the radio is collocated with the PHY, MAC and RLC (i.e., the DU functionality) whereas the CU contains RRC and PDCP. Our CU functionality is aggregated across multiple sectors/sites and is realized through a GPP solution. Our GPP components include, but not limited to, multi-core processors with real-time operating system and optional FPGA-like processing modules to offload compute-intensive operations such as PDCP ciphering, RRC AS SRB integrity protection and SRB/DRB ciphering, and deep packet inspection as part of our application intelligence. We also note that Parallel Wireless DU solution for Split 2 also involves GPP along with FPGAs to accelerate the layer 1 (PHY) and layer 2 (MAC/RLC/Scheduler) processing. Some of the baseband functionality such as channel estimation, equalization, MIMO precoding/decoding, and time/frequency-domain scheduling are implemented in the GPP whereas the processing intensive operations such as Turbo decoding are implemented in the FPGAs.

As we described in the general section, Parallel Wireless supports all split options with a goal of providing a greater flexibility in system deployment while at the same time improving the latency and reliability. Any split can be supported by utilizing the dynamic Parallel Wireless solution based on specific morphology and fronthaul limitation.

Any one-way latency from +40 msec (split 1) all the way to 250 micro second (split 8) can be supported by Parallel Wireless solution.

As described above, RAN virtualization (abstracting the underlying base stations from the core network using the HNG between the RAN and core; see documents incorporated by reference) brings the flexibility to decouple the radio and RF from the base band processing and allocate resources; when and where needed, through the most optimized manner. Parallel Wireless solution provides all necessary requirements to address this requirement based on its HNG by providing abstraction, core network isolation and resource utilization.

In general, for rural and remote areas with lower number of users, lower traffic and less than perfect fronthauls, access schema split 0 is the preferred one. At the moment, Parallel Wireless 3G/4G solution deployed across the world with HNG as the aggregator located remotely in operator colocation facilities and CWSs acting as a compact RRU/DU/CU single unit with different fronthauls including commercial LTE services and DSLs.

On the other extreme in super dense areas; e.g. stadium, shopping malls, DU/CU/Aggregator are going to located in the vicinity, a low latency and reliable fronthaul (CPRI type of connections) can connect all RRUs to the central local location through a high throughput low latency fronthaul.

Parallel Wireless believes Massive MIMO technology is a promising technology in order to address future 5G requirements for higher spectral efficiency and utilizing mmWave for access networks. Full-Dimension MIMO (FD-MIMO) targets the systems utilizing up to 64 antenna ports at the transmitter side has been already defines in 3GPP.

In general, as the number of eNB antennas increases, cross-correlation of two random channel realization goes to zero and therefore the inter-user interference in the downlink can be controlled via a simple linear precoder and reduced complexity and cost. However, this can achieve when perfect channel state information (CSI) is available at eNB. Accurate CSI acquisition in TDD system is relatively easy, but is not the case for FDD systems where time variation and frequency response of channel the channel are measures via the downlink reference signals and send back to the eNB after quantization. Even in TDD mode, the system cannot solely rely on the channel reciprocity because the measurement at the transmitter does not capture downlink interference from neighboring cells. Therefore, downlink reference signals are required to capture CQI for TDD.

We believe these two major problems related to CSI acquisition; degradation of CSI accuracy and increase in pilot overhead, need to be addressed before we witness major massive MIMO deployments. Parallel Wireless is already working to address these issues.

Parallel Wireless's SON functions are located at our HNG, and therefore will be an integrated part of our vRAN solution. It is a multi-technology platform facilitate all three elements of SON; self-configuration, self-organization and self-optimization. All fundamental functionalities; including but not limited to, mobility management, interference management and load management will be handled through SON across technologies. Because of Parallel Wireless's HNG location (sitting between core and RAN) and functionalities, it can provide the most efficient SON compare to other available solutions.

As we have described in previous sections, based on type of splits and network requirements, our CWS radio functionalities can be changed dynamically. It will depend on the type of services offered, morphology and fronthaul limitations.

The Parallel Wireless HNG can be deployed as a VNF (it is a Composite VNF, which includes a federation of VMs behaving like a single logical entity). HNG is ETSI's MANO compliant, and agnostic to the underlying Data Center infrastructure (i.e.: Intel x86 commercial off the shelf servers) and can be installed on top of all major market leading hypervisors (Linux KVM, VMware ESXi). Furthermore, HNG can be managed via any standards-compliant VNF Manager (VNFM), as well as any NFV Orchestrator (NFVO).

Taking into consideration operator needs to introduce 5G services into existing 4G network, and in line with industry trends for 5G adoption, Parallel Wireless solution is planning to support NSA Options 3/3a/3x, as well as Option 7/7x and Option 2. Parallel Wireless unique approach with its HNG enables operators to significantly simplify existing 2G/3G/4G networks and ease its evolution towards 5G.

Figure 19:
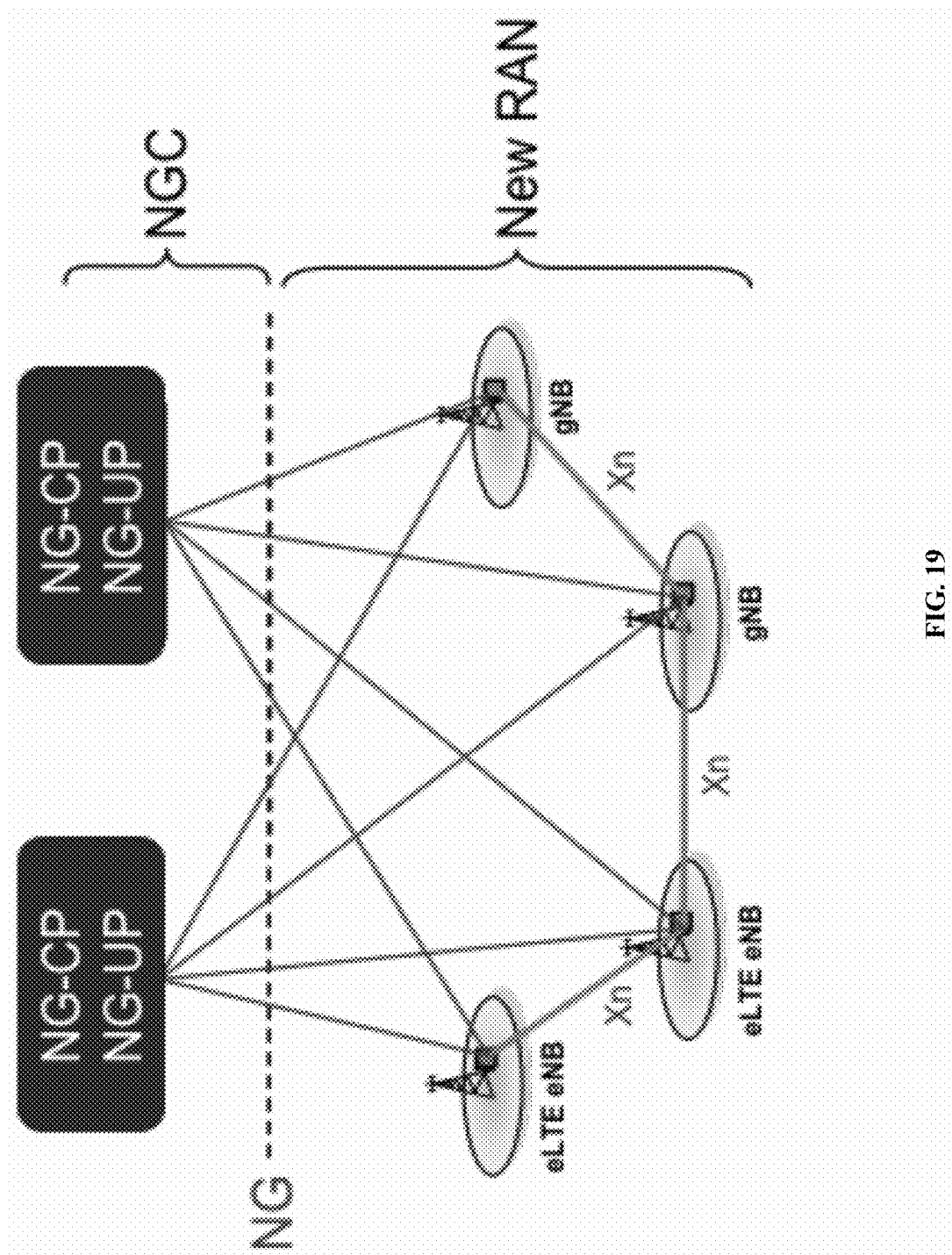
FIG. 19 is a diagram showing a wherein a new RAN is coupled to multiple NGC in accordance with some embodiments.

The new RAN introduced by 5G states a coexistence of LTE eNodeB (eNB) and the newly added gNodeB (gNB). There are new interfaces defined in this architecture:

gNB are interconnected with each other via the Xn interface gNB are connected to the NGC via NG interface (Control Plane and User Plane separately). This is shown in FIG. 19.

Those mobile operators launching 5G services with NR have several deployment options to support LTE and NG coexistence and evolution towards a pure-5G network, as shown below:

Option 3/3a/3x: Uses LTE Mobile Core (EPC) only with LTE eNB and 5G gNB. The LTE eNB is connected to the EPC in Non-standalone NR (NSA). NR's User Plane to EPC goes via the LTE eNB (option 3) or directly (option 3a). This can be the first deployment phase, where 5G NR RAN as well as 4G RAN use existing 4G/LTE Mobile Core. In this case, EPC shall support Dual Connectivity.

Option 7/7a/7x: Once the Mobile Core is upgrade to Next Gen Core (NGC), the LTE eNB is connected to it with NSA NR. The UE User Plane can connect to the NGC via either eNB (option 7) or directly (option 7a).

Option 2: this would be the case of a greenfield 5G scenario, involving only NGC and gNB (no 4G LTE or eNB RAN).

Although 3GPP has specified a few other options, it is accepted in the industry that the above cases will be the most likely to be deployed for practical reasons.

Figure 20:
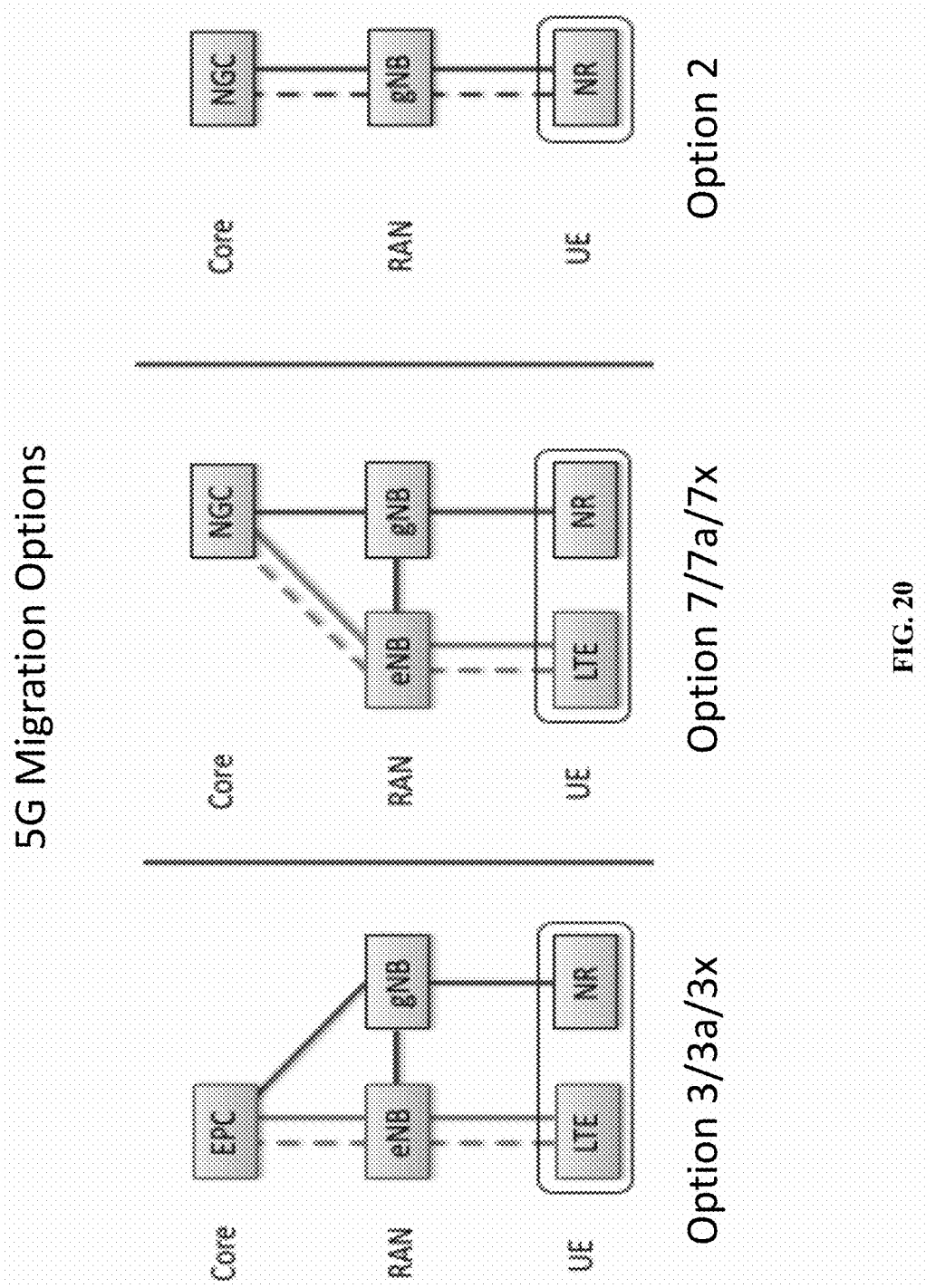
FIG. 20 is a diagram showing a 5G migration options in accordance with some embodiments.

In principle, the Xx interface implemented by the Parallel Wireless solution is going to be based in 3GPP guidance, although the final specification will become available as part of Release 15 Technical Specifications. This is shown in FIG. 20.

Parallel Wireless supports a standard Xn 3GPP-based interface to third party eNBs.

Parallel Wireless's advanced filtering solution has been tested to support B3+n78 dual connectivity.

Parallel Wireless is investigating the various techniques that can reduce out of band (OOB) spectral emissions in 5G.

At present PW are considering W-OFDM (weighted orthogonal frequency division multiplexing) as a compromise between complexity and performance.

Other techniques are also under study such as UFMC (universal filtered multicarrier), FBMC (filter bank multicarrier) and F-OFDM (filtered orthogonal frequency division multiplexing). Higher performance may be possible with these techniques, for instance with FBMC, but complexity of implementation requires further study.

Mini-slots may be supported in the future, for equipment operating above 6 GHz.

At present Parallel Wireless's main portfolio operates within or below the 3.5 GHz bands Existing equipment does not support the bands allocated for Supplemental UL e.g. L-Band, but PW can develop support if the size of the opportunity/award to PW is sufficiently large.

For shared spectrum, PW already supports products many appropriate bands e.g. 700, 800, 900, 1800 and 2100 MHz and shall extend support using 5G NR.

We consider a combined RRU/DU as the most efficient way for deploying the future generation wireless network. Since lower layer PHY (including IFFT/FFT) functions are not load related and require very high throughput and delay sensitive fronthaul if separated from RRU, it will be feasible to consider split 6, with an RRU/DU unit and a combined aggregator/CU in colocations. In case of challenges to provide reliable fronthaul for this scenario (as is discussed in detail in Split 6 section), split 2 can be the second-best option.

Splits 2 and 6 are the most suitable economic solutions based on a combined RRU/DU and combined aggregator/CU. For scenarios where population density is low and high throughput/low latency fronthauls are expensive, split 2 will provide service to the subscribers in an economic and technically desirable way. In more dense scenarios with more available options for fronthaul, split 6 will be the best scenario for deployment.

A new solution using Option 6 (MAC-PHY split) is described below. The conceptual solution is to move L2, L3 to BBU, while leaving L1, Rf/Uu at the CWS. This can be done with well-known hardware, for example using DPDK fastpath at the RAN node and the VRU. Central to the implementation is a special VRU (virtual BBU or virtual radio unit). The VRU can use an advanced femto API to communicate with the Parallel Wireless CWS. This VRU does not connect to the core network but instead connects to the Parallel Wireless HNG. It is multi-RAT-aware and -capable (2G, 3G, 4G). Virtual machines and/or containers are managed by a host hypervisor, which enables resource allocation among multiple CWSes. The HNG can be used for management, using S1 via TR69. SON may be offloaded to BBU, pool of resources for a BBU, e.g., PCI.

This new solution may be capable of flexible splits. The splits can be hybrid or heterogeneous splits, which are new. Suppose CWS A is heavily loaded. Processing can be moved to the VRU, e.g., for a single CU (central unit), DU (distribution unit) A (with option 3), or DU B (with option 6), i.e., two different splits off of the same CU. The new solution can have the ability to dynamically transition these splits, to/from the CU or between/among DUs. The new solution can dynamically support either Split 6 or Split 7, in some embodiments.

For rural deployments, for example, a fixed split is often not ideal. Rather, a flexible split is appropriate. The ability to push only PHY, or also push MAC, or adjust the split, is very helpful, particularly when the split can be based on current backhaul or fronthaul conditions. The FFT portion does not need to be performed at the BBU (VRU) either, because as the FFT portion is load-invariant. A dynamic way to push MAC from some CWS to dedicated VRU is therefore very helpful.

The ability to change the split and distribute functionalities/network elements based on capacity/latency of fronthaul is significant. This is done by having HNG evaluate fronthaul capacity/latency and dynamically enable and utilize protocol stacks on CU and RU to match the fronthaul capability. Our modular architecture and the fact that our GPP/FPGA HW at our CWS can provide enough horsepower to run protocol stacks at the edge. Further, this can be linked to SON—not only making changes in configurations, as with legacy SON, but changing protocol stacks as required.

Different types of containers may be enabled, e.g., 1 container type for each split type. When we see that the CWS is loaded (either at the HNG or at the VRU), we can transition to a new container. L2, L3 RF is transient and therefore stateless; good for containers. We note that MAC may need to be moved across machines, and MAC is not stateless, e.g., MAC may need to be moved to or from the CWS and the VRU. This problem can be solved by moving UE context data. Moving MAC to/from CWS is new to this solution.

Use cases include: deployment of CWS to rural; add VRU to effectively utilize resources; deploy a big server, or even a small server, to that location to selectively provide more powerful service as needed.

3GPP TR 38.801 is hereby incorporated by reference in its entirety. The 3GPP TR 38.801 is referred to explain technical details of the present disclosure, as well as to explain the inherent possibilities and capabilities of embodiments of the present disclosure. For example, shared RAN among multiple operators is also contemplated in conjunction with the discussion in 3GPP TR 38.801, e.g., § 5.5.

Noteworthy is that, while 5G New RAN is contemplated for 5G gNBs, the present disclosure is intended for use by operators to provide any and all combinations of 2G, 3G, 4G, and 5G, as well as Wi-Fi. For example, the various splits discussed herein could be used with one or more of these RATs or with some combination thereof, including hybrid splits with different splits for different RATs. For example, an Option 6 split may be used for 4G, while an Option 7 split may be used for 5G, and no split may be used for 2G and 3G, with all of the 2G, 3G, 4G, and 5G base stations being able to be shared among multiple operators.

In the present disclosure, the word "dynamic" is meant in at least two senses, and sometimes both, as appropriate given the context. In all senses of the word, the word indicates that the hardware is equipped to provide flexibility to the network operator. In one sense, flexibility is provided at the deploy stage, i.e., before the equipment is deployed for use. This is in accordance with the network owner's typical planning process for deploying a network. In another sense, the equipment may be able to be modified in its functional split after the deploy stage, i.e., after it has been deployed for use or even while it is in operation. In some embodiments, changing a functional split may be enabled after a reboot. In some embodiments, changing a functional split may be enabled without reboot and on a per-user or per-UE or per-bearer basis, i.e., the equipment may be enabled to change the split for individual users when new bearers are created or even while a single bearer is already in use. Different RATs may be treated differently with regards to splits, e.g., 3G may use an Option 4 split while 4G may use an Option 8 split.

In some embodiments, a CWS architecture may be used in which a radio head is coupled with an offboard, upgradeable baseband module. A digital fronthaul interface such as CPRI may be used between the modules. The offboard baseband module may be enabled to provide any of 2G, 3G, 4G, 5G, Wi-Fi, or any other baseband; the digital fronthaul interface should be designed with sufficient speed to support transmission of radio samples prior to baseband processing. In some cases, the digital fronthaul interface may be coupled with a baseband processor internal to the radio head (i.e., onboard), and use of the offboard baseband and onboard baseband may be switched dynamically based on desired performance, power usage, available processing power, and other factors as described herein. MIMO, multiple carriers, and other advanced features that require more bandwidth will require provisioning of greater fronthaul bandwidth capacity. Fiber optic or Ethernet could be used as the physical fronthaul medium.

The various functional splits are described herein with language (Option 2, Option 5, Option 6, Option 7, etc.) that is well-known to those in the art. However, it is not well-known for these functional splits may be dynamically configurable, as disclosed herein. Also, it is well-known for multiple radio heads to share a single baseband unit (baseband "hoteling"). However, it is not well-known for the radio heads to be able to use the offboard baseband units as optional and configurable and switchable. Also, it is not well-known to permit the optional use offboard baseband for different radio access technologies. Also, it is not well-known to manage the use of offboard baseband using a network configuration server that takes into account various types of load on the system (e.g., the HNG). Also, it is not well-known to have an RF chain with configurable input/output routing that is not hard-coded or hard-wired and has sufficiently high speed and low latency for it to be configured to be able to use different functional splits at different times. Also, the use of orchestration software for managing splits across multiple containers, hardware processors (CPU and FPGA) in the same CU (or DU) is also not well-known.

In various embodiments, various factors could be considered in deciding which functional split to choose. For example, aggregate data usage, aggregate signaling usage, user count, per-user data or signaling usage, fronthaul usage for a given link, backhaul usage for a given link, fronthaul latency for a given link, baseband processing load for a given RAT and node, general purpose processing for a given node, type of data being carried, required quality of service, mix of RATs, mix of data types, factors pertaining to a single base station or a set or subset of base stations, etc., could all be considered alone or in combination to determine what functional split is appropriate at a given time or in a given network context.

In conclusion, the Parallel Wireless solution envisions a dynamic solution based on available fronthauls and service requirements.

Although the methods above are described as separate embodiments, one of skill in the art would understand that it would be possible and desirable to combine several of the above methods into a single embodiment, or to combine disparate methods into a single embodiment. For example, all of the above methods could be combined. In the scenarios where multiple embodiments are described, the methods could be combined in sequential order, in various orders as necessary.

Although the above systems and methods are described in reference to base stations for the Long Term Evolution (LTE) standard and the 3GPP 5G standard, one of skill in the art would understand that these systems and methods could be adapted for use with other, present, past, or future wireless standards or versions thereof. Where eNB is mentioned, a 2G base station, 3G nB, 5G gNB, or any other base station could be used. The CWS is a multi-RAT base station; the CWS is in some embodiments capable of Wi-Fi meshing. Fronthaul data could be carried over backhaul links to the VRU in some cases.

Although the above systems and methods describe the coordination of baseband resources happening at the VRU, this may occur at the HNG and HNG functions such as SON may be performed at the VRU, or both capabilities may be combined in a single unit or logical module. The above ideas may be applied to any and all of 5G NR, standalone and non-standalone, 4G only, 3G/4G, 2G/3G/4G, or any other multi-RAT deployment architecture.

Although the above systems and methods describe specific hardware configurations, the hardware for, e.g., VRU and HNG could involve any combination or permutation of well-known data center hardware running specialized software or generic software as described herein. Containerization, OS-level or other virtualization methods could be used and various networking techniques and topologies could be used for the hardware and software running on the hardware.

The foregoing discussion discloses and describes merely exemplary embodiments of the present invention. In some embodiments, software that, when executed, causes a device to perform the methods described herein may be stored on a computer-readable medium such as a computer memory storage device, a hard disk, a flash drive, an optical disc, or the like. As will be understood by those skilled in the art, the present invention may be embodied in other specific forms without departing from the spirit or essential characteristics thereof. For example, wireless network topology can also apply to wired networks, optical networks, and the like. The methods may apply to LTE-compatible networks, to UMTS-compatible networks, or to networks for additional protocols that utilize radio frequency data transmission. Various components in the devices described herein may be added, removed, or substituted with those having the same or similar functionality. Various steps as described in the figures and specification may be added or removed from the processes described herein, and the steps described may be performed in an alternative order, consistent with the spirit of the invention. Accordingly, the disclosure of the present invention is intended to be illustrative of, but not limiting of, the scope of the invention.

The invention claimed is:

1. A method for providing Radio Access Network (RAN) dynamic functional splits, comprising:
   determining, by a user for a RAN, a first split of different functionalities between a Central Unit (CU) and a Distributed Unit (DU), the functionalities including a Radio Resource Controller (RRC), a Packet Data Convergence Protocol (PDCP), a Radio Link Control (RLC); a Medium Access Control (MAC), a Physical Layer (PHY), and a Radio Frequency Unit (RF); and
   wherein a system dynamically provides a second split of the functionalities at a later time based on factors including user count, fronthaul capacity, fronthaul usage, required baseband processing capacity, and latency, and wherein the CU and DU functionalities are located at a Virtual Radio Unit (VRU) for the second split and wherein the VRU continuously evaluates the fronthaul capacity or latency and dynamically allocates, enables or utilizes protocol stacks on CU or DU to match the available fronthaul capability at any time.

2. The method of claim 1 wherein the RLC comprises a high RLC and a low RLC.

3. The method of claim 1 wherein the MAC comprises a low MAC and a high MAC.

4. The method of claim 1 wherein the PHY comprises a low PHY and a high PHY.

5. The method of claim 1 wherein first split comprises the CU including the RRC; and the DU including the PDCP, RLC, MAC, PHY and RF.

6. The method of claim 1 wherein another split comprises the CU including the RRC and the PDCP; and the DU including the, RLC, MAC, PHY and RF.

7. The method of claim 2 wherein another split comprises the CU including the RRC, PDCP and high RLC; and the DU including the low RLC, MAC, PHY and RF.

8. The method of claim 1 wherein the first split comprises the CU including the RRC, PDCP and RLC; and the DU including the MAC, PHY and RF.

9. The method of claim 3 wherein the first split comprises the CU including the RRC, PDCP, RLC and high MAC; and the DU including the low MAC, PHY and RF.

10. The method of claim 1 wherein the first split comprises the CU including the RRC, PDCP, RLC and MAC; and the DU including the PHY and RF.

11. The method of claim 4 wherein the first split comprises the CU including the RRC, PDCP, RLC, MAC and high PHY; and the DU including the low PHY and RF.

12. The method of claim 1 wherein the first split comprises the CU including the RRC, PDCP, RLC, MAC and PHY; and the DU including the RF.

13. A non-transitory computer-readable medium containing instructions for providing Radio Access Network (RAN) dynamic functional splits which, when executed, cause a system to perform steps comprising:
   determining, by a user for a RAN, a first split of different functionalities between a central Unit (CU) and a Distributed Unit (DU), the functionalities including a Radio Resource Controller (RRC), a Packet Data Convergence Protocol (PDCP), a Radio Link Control (RLC);
   a Medium Access control (MAC), a Physical Layer (PHY), and a Radio Frequency Unit (RF); and
   wherein the system dynamically provides-a second split of the functionalities at a later time and wherein the CU and DU functionalities are located at a Virtual Radio Unit (VRU) for the second split and wherein the VRU continuously evaluates the fronthaul capacity or latency and dynamically allocates, enables or utilizes protocol stacks on CU or DU to match the available fronthaul capability at any time.

14. A system for providing Radio Access Network (RAN) dynamic functional splits, comprising:
   a converged wireless system (CWS);
   a HetNet Gateway (HNG) in communication with the CWS;
   wherein a user determines a first split of different functionalities between a central Unit (CU) and a Distributed Unit (DU), the functionalities including a Radio Resource Controller (RRC), a Packet Data Convergence Protocol (PDCP), a Radio Link Control (RLC); a Medium Access control (MAC), a Physical Layer (PHY), and a Radio Frequency Unit (RF); and wherein the system dynamically provides a second split of the functionalities at a later time and wherein the CU and DU functionalities are located at a Virtual Radio Unit (VRU) for the second split and wherein the VRU continuously evaluates the fronthaul capacity or latency and dynamically allocates, enables or utilizes protocol stacks on CU or DU to match the available fronthaul capability at any time.

* * * * *